(12) United States Patent
Nakao

(10) Patent No.: US 6,963,830 B1
(45) Date of Patent: Nov. 8, 2005

(54) APPARATUS AND METHOD FOR GENERATING A SUMMARY ACCORDING TO HIERARCHICAL STRUCTURE OF TOPIC

(75) Inventor: Yoshio Nakao, Kanagawa (JP)

(73) Assignee: Fujitsu Limited, Kawasaki (JP)

(*) Notice: Subject to any disclaimer, the term of this patent is extended or adjusted under 35 U.S.C. 154(b) by 867 days.

(21) Appl. No.: 09/593,151

(22) Filed: Jun. 14, 2000

(30) Foreign Application Priority Data

Jul. 19, 1999 (JP) .......................................... 11-205061

(51) Int. Cl.[7] .............................................. G06F 17/27
(52) U.S. Cl. ............................. 704/1; 704/9; 707/531
(58) Field of Search ...................... 704/10, 9; 707/531, 707/102; 395/761; 717/530, 531, 532; 345/349

(56) References Cited

U.S. PATENT DOCUMENTS

| | | | | |
|---|---|---|---|---|
| 5,384,703 A | * | 1/1995 | Withgott et al. ................ | 704/9 |
| 5,838,323 A | * | 11/1998 | Rose et al. .................. | 345/349 |
| 5,924,108 A | * | 7/1999 | Fein et al. ................... | 707/531 |
| 6,185,592 B1 | * | 2/2001 | Boguraev et al. ............ | 707/531 |

FOREIGN PATENT DOCUMENTS

| | | |
|---|---|---|
| EP | 855 660 A2 | 7/1998 |
| JP | A-7-182373 | 7/1995 |
| JP | A-11-045278 | 2/1999 |

OTHER PUBLICATIONS

Y. Nakao, "Summary Generation Based on the Automatic Recognition of the Semantic Hierarchical Structure of a Document," in Proceedings of Workshop Program The 4th Annual Meeting of the Association for Natural Language Processing, The Association for Natural Language Processing.

G. Salton, et al., "Automatic Text Decomposition Using Text Segments and Text Themes," in Proceeding of Hypertext '96, The Seventh ACM Conference on Hypertext, the Association for Computing Machinery.

E. Charniak, "Hidden Markov Models and Two Applications" in Statistical Language Learning, The MIT Press.

M. Nagata, "A Stochastic Japanese Morphological Analyzer Using a Forward–DP Backward–A* N–Best Search Algorithm", in Proceedings of COLING 94, vol. 1, The 15th International Conference on Computational Linguistics.

Y. Nakao, "Automatic Keyword Extraction Based on the Topic Structure of a Text," in IPSJ SIG Notes, vol. 98, No. 60, ISSN 0919–6072, 98–FI–50, The Information Processing Society of Japan.

Y. Yaari, Texplore—enploring expository texts via hierarchical representation, in Proceedings of the Workshop on Content Visualization and Intermedia Representations (CVIR '98), Association for Computational Linguistics.

C. Paice, "Constructing Literature Abstracts by Computer: Techniques and Prospects" Information Processing and Management, vol. 26, No. 1, 1990, pp. 171–186.

O. Heinonen, "Optimal Multi–Paragraph Text Segmentation by Dynamic Programming" 17th International Conference on Computational Linguistics, vol. P98, 1998, pp. 1484–1486.

(Continued)

*Primary Examiner*—Patrick N. Edouard
(74) *Attorney, Agent, or Firm*—Staas & Halsey LLP

(57) ABSTRACT

A text summarizer detects the hierarchical structure of topics in a document and extracts boundary sentences corresponding to the turning point of a topic from a candidate section of a topic boundary using the relation degree between a sentence and a topic passage. Then, the text summarizer extracts topic introductory sentences serving the purpose of introducing a topic from the introductory part of the topic beginning with this boundary sentence, and generates a summary using both the boundary sentences and topic introductory sentences.

16 Claims, 42 Drawing Sheets

OTHER PUBLICATIONS

A. Jobbins, et al., "Text Segmentation Using Reiteration and Collocation", 36th Annual Meeting of the Association fo Computational Linguistics, vol. P98, 1998, pp. 614–618.

K. Sumita et al., "Automatic Abstract Generation Based on Document Structure Analysis and its Evaluation as a Document Retrieval Presentation Function", Systems and Computers in Japan, vol. 26, No. 13, Nov. 15, 1995, pp. 32–43.

M. Hearst, "Multi-Paragraph Segmentation of Expository Text", Annual Meeting of the Association for Computational Linguistics, Jun. 26, 1994, pp. 9–16.

"Method for Automatic Extraction of Relevant Sentences from Text", IBM Technical Disclosure Bulletin, vol. 33, No. 6A, Nov. 1990, pp. 338–339.

M. Kameda, "Extraction of Major Keywords and Key Sentences by Quasi-keyword Correlation Method," in Proceedings of The Second Annual Meeting of The Association for Natural Language Processing, The Association for Natural Language Processing.

K. Sumita, et al., "Automatic Generation Based on Document Structure Analysis and Its Evaluation as a Document Retrieval Presentation Function," in The Transactions of the Institute of Electronics, Information and Communication Engineers D–II, vol. J78–D–II, No. 3, The Institute of Electronics, Information and Communication Engineers.

K. Yamamoto, et al., "GREEN: An Experimental System Generating Summary of Japanese Editorials By Combining Multiple Discourse Characteristics," in IPSJ SIG Notes, NL–99–3, The Information Processing Society of Japan.

* cited by examiner

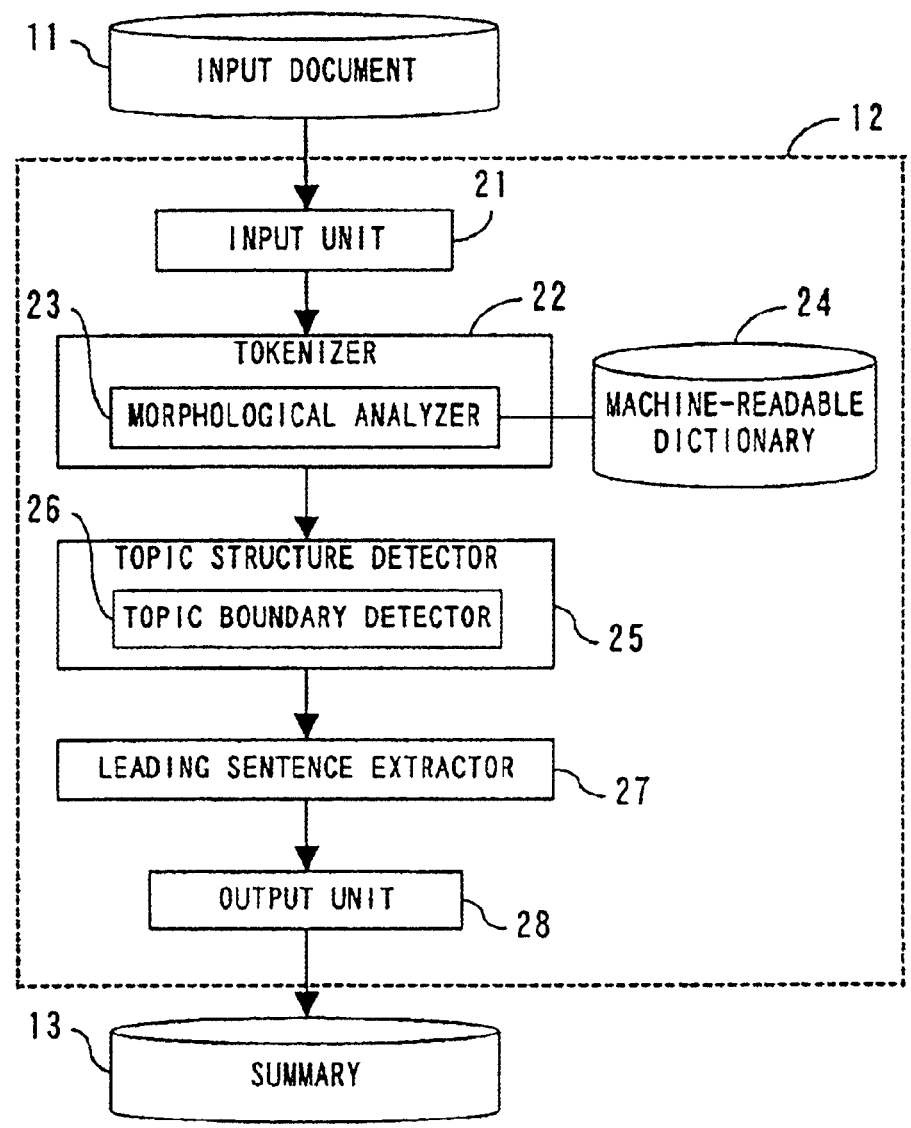
F I G. 2

4.3 ネットワーク上の検索サービス
4.3.1 検索サービスの調査
(1) WWW検索サービスの概要
(2) 情報収集／検索方式
(3) 情報提示方式
(4) 今後の課題
4.3.2 検索技術の動向
(1) キーワード抽出
(2) 文書自動分類
(3) 要約・抄録技術
(4) 分散検索
4.3.3 電子出版及び電子図書館
(1) 電子出版
(2) 電子図書館

（3）書き換え規則,Two-level モデル

（4）形態素解析,構文解析

（5）まとめ

4．4．3　情報フィルタリング技術の動向

（1）内容に基づくフィルタリング (content-based filtering)

（2）協調フィルタリング (collaborative filtering)

| INPUT SENTENCE | 東京は大都市だ | |
|---|---|---|
| | HEADING (WORD ROOT) | PART OF SPEECH |
| WORD CANDIDATE | 東 | NOUN |
| | 東京都 | NOUN |
| | 京都 | NOUN |
| | は | PARTICLE "は" |
| | 大 | PRE-FIX |
| | 都市 | NOUN |
| | だ | AUXILIARY VERB "だ" |

F I G.   1 2

INPUT SENTENCE    Tokyo is the Japanese capital.

WORD CANDIDATE

| headword | base(root) form | part of speech |
|---|---|---|
| Tokyo | Tokyo | proper noun |
| is | be | be verb (the third person singular present form) |
| the | the | definite article |
| Japanese | Japanese | proper noun |
| Japanese | Japanese | adjective |
| capital | capital | noun |

FIG. 13

| NUMBER OF TERMS | | NUMBER OF TIMES OF USE OF DOCUMENT AREA | | | | | | | | | | |
|---|---|---|---|---|---|---|---|---|---|---|---|---|
| | | a1 | a2 | a3 | a4 | a5 | a6 | a7 | a8 | a9 | a10 | a11 |
| FOUR-TERM AVERAGE (c1~c4) | LEFT WINDOW | 1 | 2 | 3 | 4 | 3 | 2 | 1 | 0 | 0 | 0 | 0 |
| | RIGHT WINDOW | 0 | 0 | 0 | 0 | 1 | 2 | 3 | 4 | 3 | 2 | 1 |
| THREE-TERM AVERAGE (c1~c3) | LEFT WINDOW | 1 | 2 | 3 | 3 | 2 | 1 | 0 | 0 | 0 | 0 | |
| | RIGHT WINDOW | 0 | 0 | 0 | 0 | 1 | 2 | 3 | 3 | 2 | 1 | |
| TWO-TERM AVERAGE (c1, c2) | LEFT WINDOW | 1 | 2 | 2 | 2 | 1 | 0 | 0 | 0 | 0 | | |
| | RIGHT WINDOW | 0 | 0 | 0 | 0 | 1 | 2 | 2 | 2 | 1 | | |

FIG. 17

| APPEARANCE POSITION OF SENTENCE | RELATION DEGREE | | | SENTENCE |
|---|---|---|---|---|
| | IMMEDIATELY BEFORE | IMMEDIATELY AFTER | IMMEDIATELY AFTER − IMMEDIATELY BEFORE | |
| ⟨OUTSIDE⟩12002 | 0.029 | 0 | −0.029 | 吉岡誌:"SGMLを使いこなす",(株)オーム社,1996 |
| 12008 | 0.016 | 0.008 | −0.008 | 吉村賢治(福岡大学),日高達,吉田将(九州大学):"日本語科学技術文における専門用語の自動抽出システム",情報処理学会論文誌,Vol.27,No.1,pp.33-40,1986 |
| ⟨BOUNDARY⟩12031 | 0 | 0.016 | 0.016 | 4.4. 検索エンジン |
| ⟨INTRODUCTORY⟩12033 | 0.008 | 0.023 | 0.015 | ここではネットワークを利用した知的情報アクセスにおける自然言語処理の役割を明らかにするために、情報検索に特に自然言語処理との関連が深い幾つかのテーマについて最新の学術的研究動向を調査した結果の報告について報告する。 |
| 12055 | 0.008 | 0.015 | 0.007 | 以下の各節に共通するテーマは、「ギガバイトあるいはテラバイトに及ぶ膨大なデータから必要な情報を得るにはどうしたらよいか?」という問題である。 |

現在しばしば用いられているWWWの情報検索は、ユーザがキーワードを入力してそれを含むページを提示したり、あらかじめ固定された概念階層をユーザがたどって好みの情報にアクセスする方法が多い。…また、こういった個人適応以外にも、リソース分類、リソースクラスタリング、リソース統合、リソース検索などの分野でアクセス方法が多様化しつつある。…

(a) Java　Javaは、Sun Microsystems 社によって開発された、ネットワークでの利用を主眼においたオブジェクト指向言語である。…

(4) 機械翻訳・言語処理技術　(a) WWWにおける機械翻訳　一昔前なら比較的高性能のワークステーションなどでしか使えなかった翻訳ソフトウェアが、パソコン上で高速に動作するようになった。…

FIG. 29

4.3 ネットワーク上の検索サービス 本節では、WWW上の検索サービスと電子出版及び電子図書館について、現在行われている各サービスの特徴、技術的なポイント、問題点等を調査すると同時に、関連する研究分野も調査し、将来どのようなサービスが望まれるか、そこに必要となる技術は何であるか、についてまとめる。…(7) 同義語提示 (あちゃらNAVI) 約7万語の同義語辞書を利用して、入力されたキーワードの同義語を検索結果ページに表示し、再検索に利用できる。

(1) キーワード ネットワーク上の文書をアクセスする方法の1つとしてキーワード検索がある。…
(2) 文書自動分類 ネットワーク上の文書をアクセスする方法の1つとして分類検索がある。…

(4) 分散検索 情報を一ヶ所に集中登録するタイプの検索サービスでは、今後ますます肥大化・多様化していくWWWには対応しきれなくなることが予想される。この問題を解決するためには、各検索サービスが互いに独立して動作するのではなく、相互に連携しあう必要がある。…4.3.3 電子出版及び電子図書館 印刷技術が発明されて以来、紙を用いて行われてきた出版が、計算機および計算機ネットワークの普及にともない、電子的に行われるようになってきた。…荒木啓介、金子明夫、高野文庫、日夏健一 (日本科学技術情報センター): "日本語論文タイトルからのキーワード自動抽出システム (JAKAS)", 情報処理学会自然言語処理研究会, 26-3, pp.1-6, 1981…

4．4．3 情報フィルタリング技術の動向 情報フィルタリング（information filtering）とは、動的に変化する情報の集合の中から、ユーザのニーズに合致する情報を取り出す技術である。…4．4．4 情報抽出/統合技術の動向…WWWの普及による大量かつ異種の情報の流通は、情報過多（information overload）の問題を引き起こしている。…

[青江,92a] 青江順一 (徳島大学)：静的ハッシュ法とその応用、キー検索技法 – I, 情報処理, Vol.33, No.11, pp.1359-1366, 1992.…

本節では、WWW上の検索サービスと電子出版及び電子図書館について、現在行われている各サービスの特徴、技術的なポイント、問題点等を調査すると同時に、関連する研究分野も調査し、将来どのようなサービスが望まれるか、また、そこに必要となる技術は何であるか、についてまとめる。…(1) キーワード抽出 ネットワーク上の文書をアクセスする方法の1つとしてキーワード検索がある。…(4) 分散検索…

4.4 検索エンジン

ここではネットワークを利用した知的情報アクセスにおける自然言語処理の役割を明らかにするために、情報検索において特に自然言語処理との関連が深い幾つかのテーマについて最新の学術的研究動向を調査した結果について報告する。…4.4.3 情報フィルタリング技術の動向 情報フィルタリング (information filtering) とは、動的に変化する情報の集合の中から、ユーザのニーズに合致する情報を取り出す技術である。…

本節では、WWW上の検索サービスと電子出版及び電子図書館について、現在行われている各サービスの特徴、技術的なポイント、問題点等を調査すると同時に、関連する研究分野も調査し、将来どのようなサービスが望まれるか、また、そこに必要となる技術は何であるか、についてまとめる。…（1）キーワード抽出　ネットワーク上の文書をアクセスする方法の1つとしてキーワード検索がある。…（4）分散検索…

検索エンジン（4．4．参照）

ここではネットワークを利用した知的情報アクセスにおける自然言語処理の役割を明らかにするために、情報検索において特に自然言語処理との関連が深い幾つかのテーマについて最新の学術的研究動向を調査した結果について報告する。…4．4．3　情報フィルタリング技術の動向　情報フィルタリング (information filtering) とは、動的に変化する情報の集合の中から、ユーザのニーズに合致する情報を取り出す技術である。…

本節では、WWW上の検索サービスと電子出版及び電子図書館について、現在行われている各サービスの特徴、技術的なポイント、問題点等を調査すると同時に、関連する研究分野も調査し、将来どのようなサービスが望まれるか、また、そこに必要となる技術は何であるか、についてまとめる。…

TITLE: SGML Type Document Managing Aparatus and Managing Method
  Background of the Invention (Bg)
    Field of the Invention
    Description of the Related Art
  Summary of the Invention
  Brief Description of Drawings
  Description of Preferred Embodiment (Preferred Embodiment)
    [1] Partial editing DTD (< 1 >)
    [2] Revision history information (< 2 >)
  What is claimed is: (Claims)

FIG. 36

SGML Type Document Managing Apparatus and Managing Method
Background of the Invention Field of the Invention The present invention relates to an SGML (Standard Generalized Markup Language) document managing apparatus for allowing users to collaboratively create, edit, and revise a large SGML document sequence, such as a manual.

F I G. 37

SGML[SGML] Type[type] Document[document] Managing [managing] Apparatus [apparatus] and Managing[managing] Method[method]

Background[background] of the Invention[invention] Field[field] of the Invention[invention]

The present[present] invention[invention] relates[relates]to an SGML[SGML] (Standard[standard] Generalized[generalized] Markup[markup] Language[language]) document[document] managing[managing] apparatus[apparatus]for allowing[allowing] users[users] to collaboratively[collaboratively] create [create], edit[edit], and revise[revise] a large[large] SGML[SGML] document[document]sequence[sequence], such as a manual[manual].

FIG. 38 a, above, according, after, against, all, along, already, also, although, always, among, an, and, and/or, another, any, anywhere, are, as, at, be, because, been, before, before/after, being, belonging, belongs, below, between, both, but, by, can, cannot, corresponding, do, does, each, either, else, especially, even, every, first, for, forth, from, further, has, have, he/she, his/her, however, if, in, into, is, it, its, just, later, least, mainly, may, more, moreover, most, much, namely, next, no, not, of, on, once, one, only, or, other, others, otherwise, out, part, previous, same, second, should, since, so, some, someone, such, than, that, the, their, them, then, there, thereafter, thereof, these, they, this, those, through, thus, to, too, two, types, under, unless, unlike, until, up, used, usually, was, well, were, what, when, where, whereby, wherein, whether, which, while, who, whole, whose, why, will, with, with/without, without, yes

FIG. 39

| APPEARANCE POSITION OF SENTENCE | RELATION DEGREE | | | DESCRIPTION OF SENTENCE |
|---|---|---|---|---|
| | IMMEDIATELY BEFORE | IMMEDIATELY AFTER | IMMEDIATELY AFTER −IMMEDIATELY BEFORE | |
| ⟨OUTSIDE⟩5522 | 0.025 | 0.008 | −0.017 | At step S84, the SGML document accessing unit 30 adds 1 to the element number. |
| 5531 | 0.032 | 0.008 | −0.024 | At step S85, the SGML document accessing unit 30 appends the extracted content token attached with the element number as an extra element number to the append-reservation option element list. |
| 5551 | 0.045 | 0.005 | −0.040 | At step S86, the SGML document accessing unit 30 extracts the next content token. |
| 5560 | 0.026 | 0 | −0.026 | Thereafter, the flow returns to step S83. |
| ⟨BOUNDARY⟩5564 | 0 | 0.089 | 0.089 | [2] Revision history information |
| ⟨INTRODUCTORY⟩5567 | 0.002 | 0.051 | 0.049 | (1) Method for storing revision history |
| 5571 | 0.016 | 0.011 | −0.005 | The extended content model as shown in Fig. 7 represents the arrangement of all elements in an immediate lower hierarchical level of a particular document element. |

FIG. 41

SGML Type Document Managing Apparatus and Managing Method

Background of the Invention

Field of the Invention

⋮

This process is performed by the client 2.

... At step S3, the SGML document editing unit 10 determines whether or not the element has been successfully select-reserved. ...

[2] Revision history information
(1) Method for storing revision history

The extended content model as shown in Fig. 7 represents the arrangement of all elements in an immediate lower hierarchical level of a particular document element. ... Figs. 22 to 29 are flowcharts showing a document editing process of the SGML document editing unit 10. Figs. 22 and 23 show the entire flow of the entire document editing process. ...

Next, the operation of the above-described embodiment will be described.

1) Improving the flexibility of the partial editing work with append-/delete-reservation system
... The document managing system as set forth in claim 23, wherein ...

FIG. 42

APPARATUS AND METHOD FOR GENERATING A SUMMARY ACCORDING TO HIERARCHICAL STRUCTURE OF TOPIC

BACKGROUND OF THE INVENTION

1. Field of the Invention

The present invention relates to an apparatus and method for summarizing machine-readable documents written in a natural language, etc. In particular, it is intended to support a user to read a long document on a computer display, such as a manual, report, book, etc., by generating a summary which can be accommodated in approximately one screen and provides a user with the essence of the document content.

2. Description of the Related Art

For a prime text summarization technology which is currently actually used, there is a technology of generating a summary by detecting and extracting a key sentence in a document. This technology is further classified into several methods according to a clue used to evaluate the importance of a sentence. For the typical methods, there are the following two methods.

(1) A method utilizing the appearance frequency and distribution of words in a document as clues; and
(2) A method utilizing the coherence relation between sentences and the appearance position of a sentence as clues.

The first method, first determines the importance of words (phrases) in a document and evaluates the importance of the sentence according to the number of important words contained in the sentence. Then, the method selects key sentences based on the evaluation result and generates a summary.

As methods for determining the importance of a word in a document, there are several well-known methods as follows: a method of utilizing the appearance frequency (number of times of use) of the word in a document without modification, a method of weighing the appearance frequency of the word with a difference between the appearance frequency of the word and the appearance frequency of the word in a more general document collection, etc., and a method of weighing the appearance frequency of the word with the appearance position of the word, for example, weighing a word which appears in a heading to be important, etc.

The text summarization method of this kind, for example, includes the following methods.

Japanese Patent Application Laid-open No. 6-259424 "Document Display Apparatus and Digest Generation Apparatus and Digital Copying Apparatus" and a piece of literature by the inventor of the invention (Masayuki Kameda, "Extraction of Major Keywords and Key Sentences by Pseudo-Keyword Correlation Method", in the Proceedings of the Second Annual Meeting of the Association for Natural Language Processing, pp. 97–100, March 1996) generates a summary by extracting parts including many words which appear in a heading as important parts deeply related to the heading.

Japanese Patent Application Laid-open No. 7-36896 "Method and Apparatus for Generating Digest" extracts major expressions (word, etc.) as seed from a document based on the complexity of an expression (length of a word, etc.) and generates a summary by extracting sentences including more of the major expression seed.

Japanese Patent Application Laid-open No. 8-297677 "Method of Automatically Generating Digest of Topics" detects "topical terms" based on the appearance frequency of words in a document and generates a summary by extracting sentences containing many major "topical terms".

The second method judges the (relative) importance of sentences based on the coherence relation between sentences, such as sequence, contrast, exemplification, etc., or the position of sentences in a document, etc., and selects important sentences.

This method is introduced in pieces of literature, such as Japanese Patent Application Laid-open No. 6-12447 "Digest Generation Apparatus", Japanese Patent Application Laid-open No. 7-182373 "Document Information Search Apparatus and Document Search Result Display Method" and a piece of literature by the inventors of these inventions (Kazuo Sumita, Tetsuro Chino, Kenji Ono and Seiji Miike, "Automatic Abstract Generation based on Document Structure Analysis and Its Evaluation as a Document Retrieval Presentation Function", in the Journal of the Institute of Electronics Information and Communication Engineering, Vol. J78-D-II, No. 3, pp. 511–519, March 1995), and a piece of literature by another author (Kazuhide Yamamoto, Shigeru Masuyama and Shozo Naito, "GREEN: An Experimental System Generating Summary of Japanese Editorials by Combining Multiple Discourse Characteristics" in the IPSJ SIG Notes, Information Processing Society of Japan, NL-99-3, January 1994), etc.

These text summarization technologies are effective for a single-topic text, such as a newspaper article, editorial, thesis, etc., but it is difficult to generate a summary of a long text which comprises several parts of different topics.

According to the first method, it is difficult to determine the importance of words in such a multi-topic text because important words should differ for each topic.

According to the second method, coherence relation between sentences, which is expressed by a conjunction, etc., is local. Therefore, it is difficult to judge the relative importance among large textual units, such as those beyond a section, because they are usually constructed only with weak and vague relations or arranged almost at random from the view point of coherence relations.

Under these circumstances, a technology for generating a summary in combination with a technology for detecting topic passages in a document has been developed to solve this problem.

For example, a piece of literature by the inventor of the present invention (Yoshio Nakao, "Digest Generation based on Automatic Detection of Semantic Hierarchic of a Text", in the Proceedings of a Workshop held alongside the Fourth Annual Meeting of the Association for Natural Language Processing, pp. 72–79, March 1998) and a prior Japanese Patent Application No. 10-072724 "Digest Generation Apparatus and Method thereof" (corresponding U.S. application Ser. No. 09/176,197) discloses a technology for detecting the hierarchical structure of topics in a document and extracting sentences containing many words characteristic of each topic.

Japanese Patent Application Laid-open No. 11-45278 "Document Processing Apparatus, Storage Medium recording Document Process Program and Document Process Method" discloses an idea of dividing an entire document into several sub-documents, detecting the break of a topic flow by checking the lexical similarities between the sub-documents and generating a summary for each topic.

Although this literature only briefly discloses the detection method of the change of topics at an abstract level, it is considered to be a variant of the prior art, such as a piece of literature by Salton et al.(Gerard Salton, Amit Singhal, Chris Buckley and Mandar Mitra, "Automatic Text Decomposition using Text Segments and Text Themes, in Proc. of Hypertext '96, pp. 53–65, the Association for Computing Machinery, March 1996).

Although it does not aim to generate a summary of a long document, Japanese Patent Application Laid-open No.2-254566 also presents a text summarization method based on topic passage detection. It detects semantic paragraphs by connecting a series of structural paragraphs (paragraphs structurally distinguished by an indentation, etc.) based on their content relevance, and generates a summary using keywords with a high appearance frequency extracted both from the entire text and from each semantic paragraph.

However, there is a problem relates to textual coherence of a summary. To make a very short summary of less than 1% of a source text, only a small number of sentences can be extracted among many important sentences. Therefore, a summary generated simply by extracting important sentences may become merely a collection of unrelated sentences. Furthermore, an important point with originality should be new information and needs some introductions for a reader to understand.

At this point, some appropriate mechanisms are required for improving textual coherence of a summary and for making a summary understandable in addition to the conventional text summarization technology described above.

In addition, there is another problem relates to readability of a summary. A summary of a long text naturally becomes long. For example, a summary of a book of one hundred pages will be one page even in a high compression rate of 1%. A one-page summary is much shorter than such a long source text, but is too long for a user to read easily without some breaks indicating turns of topics or discussions. Even for a entire expository text, a piece of literature by Yaari (Yaakov Yaari, "Texplore-exploring expository texts via hierarchical", in Proceedings of the Workshop on Content Visualization and Intermedia Representations (CVIR '98), Association for Computational Linguistics, August 1998) proposed a method for visualizing a hierarchical structure of topics with generated headers to assist a reader in exploring content of an expository text, it is strongly required for a summary to help a user to understand quickly.

At this point, the Japanese Patent Application Laid-open No. 6-12447, described above, also discloses a technology for generating a summary for each chapter or section which is detected using a rendering features of a logical document element, such as a section header tends to comprise a decimal number followed by capitalized words. However, such a method that detects a large textual unit based on rendering features is not expected to have wide coverage. In other words, since rendering features of logical elements vary according to document types, there is a problem that heuristic rules for detection must be prepared according to every document type. Moreover, the logical structure of a text does not always correspond to its topic structure, especially in such a case that a section comprises an overview clause followed by the other ones that can be divided into several groups by the subtopics they discuss.

To avoid these problems, the present invention using a method to detect the hierarchical topic structure of a source text not by rendering features but by linguistic features a text has in general, and provide a mechanism to improve the readability of a summary based on the hierarchical topic structure of a source text.

SUMMARY OF THE INVENTION

An object of the present invention is to provide a text summarization apparatus for generating a summary easy to understand from a long document and presenting a long summary in a manner that is easy to read and a method thereof.

In the first aspect of the present invention, the text summarization apparatus comprises a structure detection device, a leading sentence extraction device and a summary composition device. The structure detection device detects the hierarchical structure of topics in a given document. The leading sentence extraction device detects an introductory part of each topic and extracts one or more sentences directly indicating a topic content from the detected introductory part in a concentrated manner. The summary composition device groups the extracted sentences for each topic and generates a summary.

In the second aspect of the present invention, the text summarization apparatus comprises a leading sentence extraction device and a summary composition device. The leading sentence extraction device detects the introductory part of each topic in a given document and extracts one or more sentences from the introductory part in a concentrated manner. The summary generation device generates a summary using the extracted sentences.

BRIEF DESCRIPTION OF THE DRAWINGS

FIG. 2 shows the basic configuration of the text summarizer.

FIG. 5 shows an example of the headings in the first input document (No. 1).

FIG. 6 shows an example of the headings in the first input document (No. 2).

FIG. 7 shows an example of headings in the first input document (No. 3).

FIG. 9 shows the first input document.

FIG. 10 shows the first tokenization result.

FIG. 12 shows an example of a dictionary consultation in the case of Japanese-language lookup.

FIG. 13 shows an example of a dictionary consultation in the case of English-language lookup.

FIG. 17 shows a relationship between a moving average and a document area.

FIG. 25 shows the first detection example of a boundary sentence and a topic introductory sentence.

FIGS. 29A and 29B show the first summarization result (No. 1) in Japanese and translated into English, respectively.

FIGS. 30A and 30B show the first summarization result (No. 2) in Japanese and translated into English, respectively.

FIGS. 31A and 31B show the first summarization result (No. 3) in Japanese and translated into English, respectively.

FIGS. 32A and 32B show the second summarization result in Japanese and translated into English, respectively.

FIGS. 33A and 33B show the first improvement example of the second summarization result in Japanese and translated into English, respectively.

FIGS. 35A and 35B show the second improvement example of the second summarization result in Japanese and translated into English, respectively.

FIG. 36 shows headings in the second input document.

FIG. 37 shows the second input document.

FIG. 38 shows the second tokenization result.

FIG. 39 shows stop words.

FIG. 41 shows the second detection example of a boundary sentence and a topic introductory sentence.

FIG. 42 shows the third summarization result.

DESCRIPTION OF THE PREFERRED EMBODIMENTS

The preferred embodiments of the present invention are described in detail below with reference to the drawings.

Figure 1:
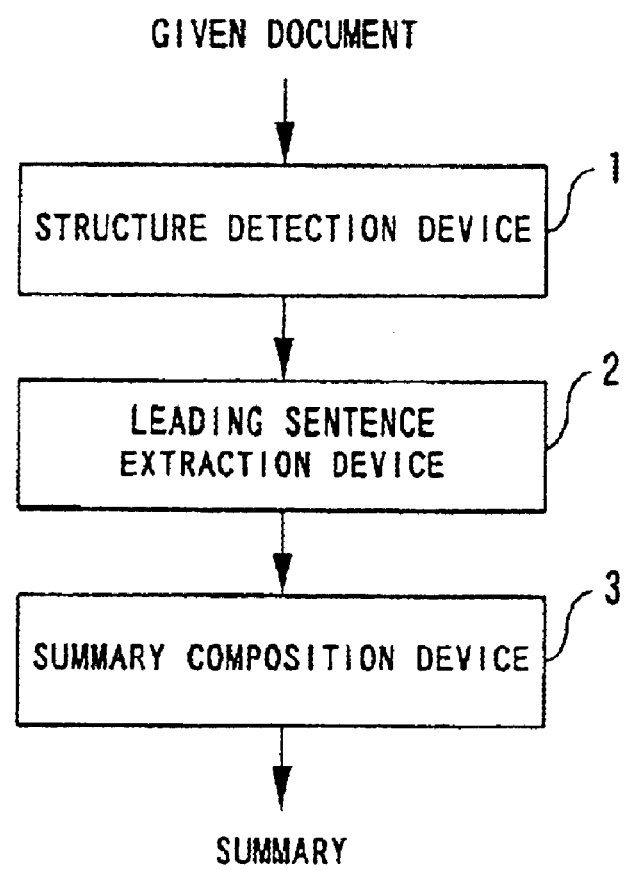
FIG. 1 shows the basic elements of the text summarizer of the present invention.

FIG. 1 shows the basic elements of the text summarizer of the present invention. The text summarizer shown in FIG. 1 comprises a structure detection device 1, a leading sentence extraction device 2 and a summary composition device 3.

The structure detection device 1 detects the hierarchical structure of topics in a given document. The leading sentence extraction device 2 detects an introductory part of each topic and extracts one or more sentences directly indicating a topic content from the detected introductory part as leading sentences in a concentrated manner. The summary composition device 3 groups the extracted leading sentences for each topic and generates a summary.

The structure detection device 1, for example, sets up window widths of several sizes ranging from ¼ to ¹⁄₁₀ of an entire document to a paragraph, and measures a cohesion degree indicating the strength of lexical cohesion in each window width. Thus, both global cohesion mainly due to words repeated at long intervals, and local cohesion due to words repeated at short intervals, can be obtained, and thereby the hierarchical structure of topics covering a large topic passage and a small topic passage can be detected.

Here, the hierarchical structure of topics means a hierarchical structure with two or more layers of a plurality of topic passages composing a document. This hierarchical structure, for example, corresponds to the inclusion relation between topics in which each of a plurality of long passages composing a document contains one or more short topic passages and each of the short topic passages further contains one or more shorter topic passages.

The leading sentence extraction device 2 selects a topic of an appropriate grading (size) using the hierarchical structure of topics and extracts leading sentences from the introductory part of each topic. As the introductory part of a topic, for example, a prescribed area in the vicinity of the start position of the topic is designated, and leading sentences are extracted from the area in a concentrated manner (locally).

For example, to make summary of a major topic, the leading sentence extraction device 2 extracts leading sentences not only from the introductory part of the major topic but also from the introductory part of a minor topic located at almost the same start position as that of the major topic. The leading sentence extraction device 2 also extracts a leading sentence from the introductory part of a minor topic included in a major topic if there is room in an extraction amount. Since leading sentences are extracted from a fairly narrow range in a concentrated manner, the possibility that a summary may become a collection of unrelated sentences decreases.

Alternatively, the leading sentence extraction device 2 adjusts the topic boundaries detected by the structure detection device 1, and extracts a sentence at the boundary for each topic of an appropriate grading. First, it extracts several candidate sentences in the vicinity of each topic boundary, then identifies a boundary sentence which probably corresponds to a turning point of a topic, from the candidate sentences based on two kinds of relevance scores concerning a sentence: a forward relevance, indicating the sentence relevance to the topic passage just after the sentence, and ba backward relevance, indicating the sentence relevance to the topic passage just before the sentence.

For example, it calculates the difference between the forward and backward relevance as a relative forward relevance for each sentence in the vicinity of a topic boundary in the appearance order, and extracts a sentence at which the relative forward relevance rapidly increases as a boundary sentence.

Since a turning point of a topic can be detected only with the two kinds of relevance scores in this manner, sentences directly indicating topic content, such as headings located at the start position of a topic, can be extracted even without referring to a logical structure of an input document.

Furthermore, the leading sentence extraction device 2 adopts a rage of several sentences beginning with a boundary sentence as an introductory part, and extracts a topic introductory sentence, which probably serves the purpose of introducing a topic, from each introductory part. For example, it calculates the forward relevance for each sentence in an introductory part, and extracts a sentence with the maximum forward relevance as a topic introductory sentence.

The summary composition device 3 composes a summary by grouping the sentences extracted by the leading sentence extraction device 2 for each topic of an appropriate grading. For example, if the leading sentence extraction device 2 extracts sentences concerning two topics, the summary composition device 3 divides the extracted sentences into two topic groups and generates a summary by separating the groups with a blank line so that a reader can easily found out major topics of the source text with a summary.

For this purpose, the leading sentence extraction device 2 in advance determines the appropriate size of a topic passage from which leading sentences should be extracted according to the output amount of the summary, and selects those passages of appropriate size based on the hierarchical structure of topics detected by structure detection device 1. Thus, topics of a preferable grading can be effectively taken into a summary.

Furthermore, if a leading sentence extracted by the leading sentence extraction device 2 is a heading with an order label, such as a section header with a section number, the summary composition device 3 separates the order label and body part of the sentence and outputs only the body part of the sentence. Thus, a user can read a summary without being bothered by label, which has no great meaning in a summary.

Alternatively, the summary composition device 3 can process the separated order label and output it as supplementary information to indicate the corresponding location in the original documents. In this case, the order label is transformed and outputted in such a way not to disturb the reader of a summary.

FIG. 2 shows the basic configuration of the summary generator of the present invention. In FIG. 2, if an input document 11 is inputted, a text summarizer 12 generates and outputs a summary 13. The structure detection device 1, leading sentence extraction device 2 and summary composition device 3 shown in FIG. 1 correspond to the topic structure detector 25, leading sentence extractor 27 and output unit 28, respectively.

The text summarizer 12 comprises an input unit 21, a tokenizer 22, a machine-readable dictionary 24, a topic structure detector 25, a leading sentence extractor 27 and an output unit 28.

The input unit 21 reads an input document 11 and passes the input document to the tokenizer 22. The tokenizer 22 includes a morphological analyzer 23 as a sub-module. The tokenizer 22 analyzes the input document 11 using the morphological analyzer 23, and extracts content words (noun, verb, adjective, adjective verb, etc.) from the input document 11. At this time, the morphological analyzer 23 converts sentences in the input document 11 to a word list with part-of-speech information by referring to the machine-readable dictionary 24. The machine-readable dictionary 24 is a word dictionary for morphological analysis and describes a correspondence between the notation character string of a word and information about the part of speech/conjugation, etc.

The topic structure detector 25 includes a topic boundary detector 26 as a sub-module, and automatically detects topic passages, i.e. continuous parts of the input document 11 describing a common topic, using the topic boundary detector 26. The topic boundary detector 26 detects topic boundary candidate sections corresponding to sections of a low lexical cohesion degree. A lexical cohesion degree is an index for the strength of lexical cohesion in the vicinity of each position in the input document 11, and for example, is calculated from the lexical similarity of a vocabulary which appears in windows of a specific width set up before and after each position.

The leading sentence extractor 27 first detects the introductory part of a topic located in the vicinity of the start position of each topic passage detected by the topic structure detector 25, and detects a leading sentence from the detected introductory part. Then, the leading sentence extractor 27 calculates the number of topics to be extracted for a summary based on the ratio of the size of the input document 11 and preferable summary size, and determines the size of a topic passage as the unit of summary generation. Then, the leading sentence extractor 27 extracts a leading sentence from a topic passage of approximately the determined size.

The output unit 28 groups the sentences extracted by the leading sentence extractor 27 for each topic, generates a summary 13 and outputs the summary 13 as the process result.

According to the text summarizer 12 shown in FIG. 2, the topic structure detector 25 detects topic passages, which are continuous document parts describing a same topic, and the leading sentence extractor 27 extracts sentences only from vicinity of the start position of each topic passage. Since sentences composing a summary are extracted in a fairly narrow range in a concentrated manner, the possibility that the summary may become merely a collection of unrelated sentences decreases.

In addition, the leading sentence extractor 27 extracts several sentences in the vicinity of each topic boundary in the appearance order and detects a sentence at which the relation degree with a topic immediately after a topic boundary (forward relation degree) rapidly increases compared with the relation degree with a topic immediately before the topic boundary, as a boundary sentence. Thus, sentences corresponding to the turning point from a topic immediately before the topic boundary to a topic immediately after the topic boundary can be accurately extracted even without reference to the logical structure of the input document 11.

Furthermore, the leading sentence extractor 27 extracts candidate sentences in a range of several sentences after a boundary sentence, calculates the forward relation degree of sentences after the boundary sentence and extracts a sentence of which the forward relation degree becomes a maximum, as a topic introductory sentence. Since sentence deeply related to a subsequent topic passage is extracted from a position a little after the turning point of a topic, the possibility that a sentence serving the purpose of supplying supplementary information about a topic may be extracted, increases.

The leading sentence extractor 27 also selects a topic passage of an appropriate grading the coherence of which is strong among topic passages detected by the topic structure detector 25, as a topic passage from which a leading sentence is extracted and extracts a leading sentence from the topic passage. Thus, topics of a preferable grading can be efficiently extracted to a summary.

The output unit 28 groups the sentences extracted by the leading sentence extractor 27 for each topic of an appropriate grading, and generates and outputs a summary. Since a summary can be divided into passages of an appropriate grading, a summary that is easy to read and in which the breaks of a content can be found at a glance can be generated even if a summary 13 becomes long.

Furthermore, the output unit 28 processes and outputs the order label information of a heading with order label information, such as a chapter number, etc., into supplementary information for indicating a correspondence with a body. Thus, a user can read a summary through without being disturbed by an order label which has no great meaning in the summary. The correspondence between the content of the summary 13 and the content of an input document 11 can be easily understood.

Figure 3:
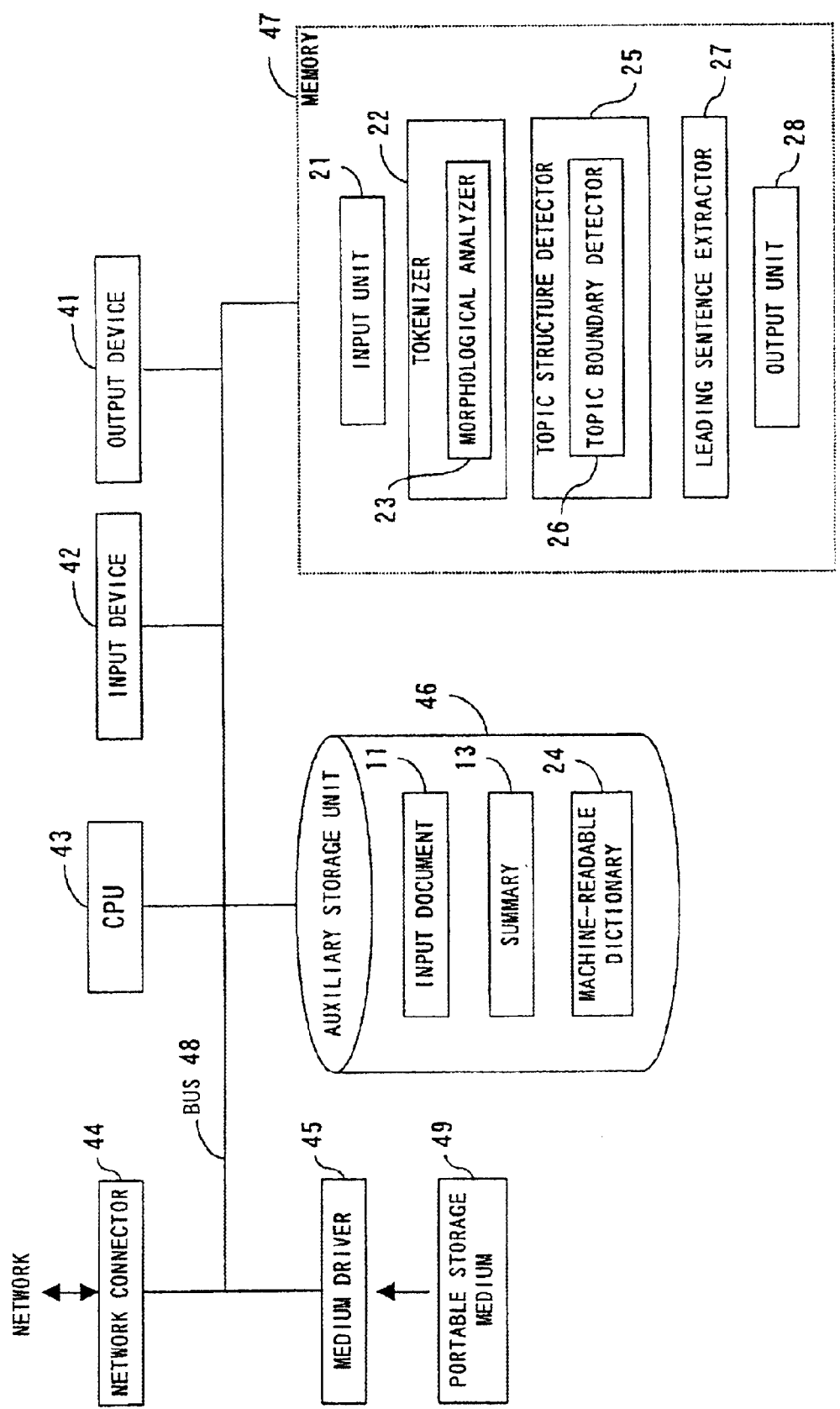
FIG. 3 shows the configuration of an information processor.

The text summarizer 12 shown in FIG. 2, for example, can be configured using the information processor (computer)

shown in FIG. 3. The information processor shown in FIG. 3 comprises an output device 41, an input device 42, a CPU (central processing unit) 43, a network connector 44, a medium driver 45, an auxiliary storage unit 46 and a memory (main storage unit) 47, which are connected to one another using a bus 48.

The memory 47 includes a ROM (read-only memory), RAM (random access memory), etc., and stores a program and data used for summary generation. In this example, the input unit 21, tokenizer 22, morphological analyzer 23, topic structure detector 25, topic boundary detector 26, leading sentence extractor 27 and output unit 28 shown in FIG. 2 are stored in the memory 47 as program modules. The CPU 43 performs necessary processes by using the memory 47 and running the program.

The output unit 41, for example, is a display, printer, etc., and is used to output inquiries, a summary 13, etc., to a user. The input unit 42, for example, is a keyboard, pointing device, touch panel, etc., and is used to input instructions and an input document 11 from a user.

The auxiliary storage unit 46, for example, is a magnetic disk, optical disk, magneto-optical disk, etc., and stores information, such as an input document 11, summary 13, machine-readable dictionary 24, etc. The information processor can also store in advance the program and data described above in the auxiliary storage unit 46 and use the program and data by loading them into the memory 47, if required.

The medium driver 45 drives a portable storage medium 49 and accesses the recorded content. For the portable storage medium 49, an arbitrary computer-readable storage medium, such as a memory card, floppy disk, CD-ROM (compact disk read-only memory), optical disk, magneto-optical disk, etc., is used. A user can also store in advance the program and data described above in the portable storage medium and use the program and data by loading them into the memory 47, if required.

The network connector 44 communicates with an outside device via an arbitrary network (line), such as a LAN (local area network), etc., and transmits/receives data accompanying communications. The information processor can also receive the program and data described above from an outside device and use the program and data by loading them into the memory 47, if required.

Figure 4:
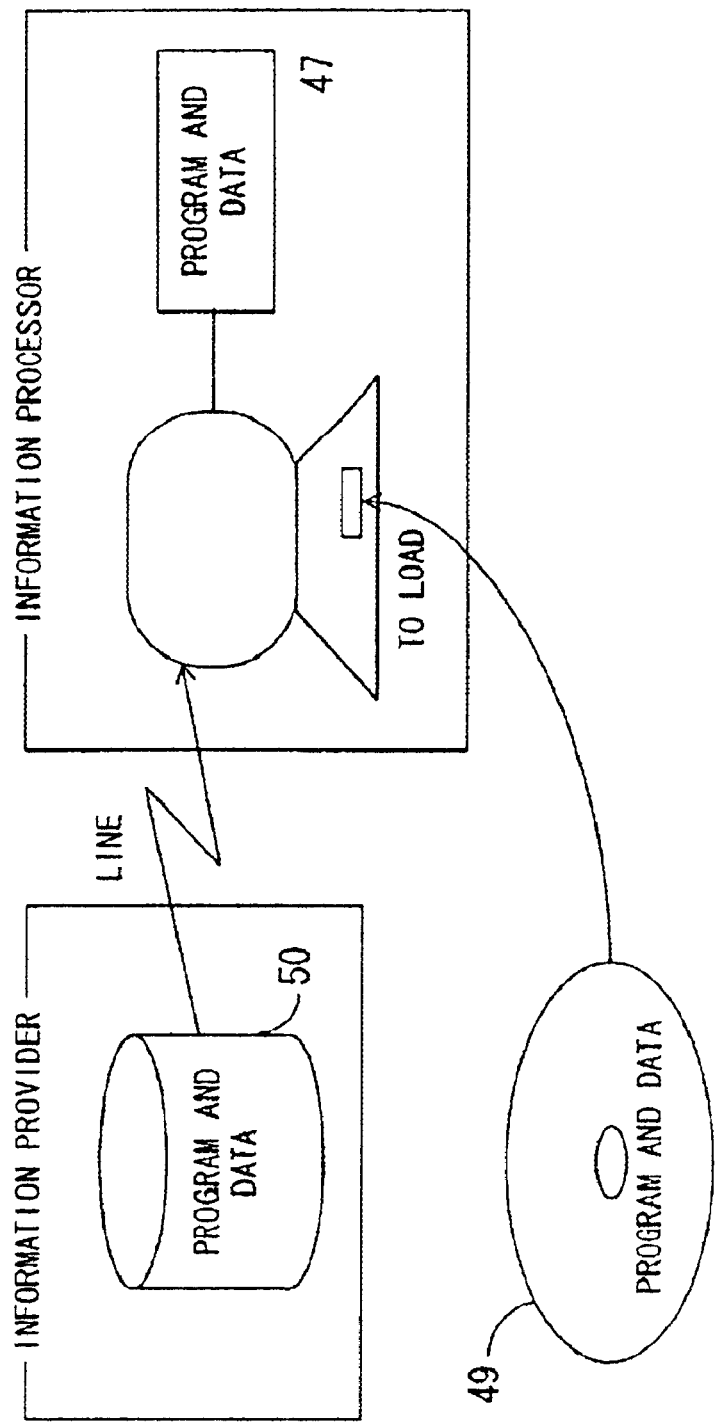
FIG. 4 shows a variety of storage media.

FIG. 4 shows a variety of computer-readable portable storage media for supplying the information processor shown in FIG. 3 with a program and data. The program and data stored in the portable storage medium 49 or an outside database 50 are loaded to the memory 47. Then, the CPU 43 performs necessary processes by running the program and using the data.

Next, the operation of each module of the text summarizer 12 shown in FIG. 2 is described in detail using a specific example. As an input document in Japanese, Chapter 4 "Activity Report of Network Access Technical Special Committee" (pp. 117–197) of "Survey Report on Trends in Natural Language Processing Systems" by the Japan Electronic Industry Development Association (March 1997), is used. In the following embodiment, a summary consisting of a couple of A4-size sheets (approximately 1,500 characters) is attempted to be generated from this document.

Conventionally, for the size of a summary, approximately ¼ of an original document has been aimed at. It is a good ratio for an editorial, newspaper article, theses of several pages, etc., but is too large for such a long document of several tens of pages, as the one attempted to be summarized in this example (81 pages). When a document is read online, the maximum number of pages capable of being displayed on a screen at one time is approximately two. Taking these conditions into consideration, the size of the summary has been determined.

Figure 5:
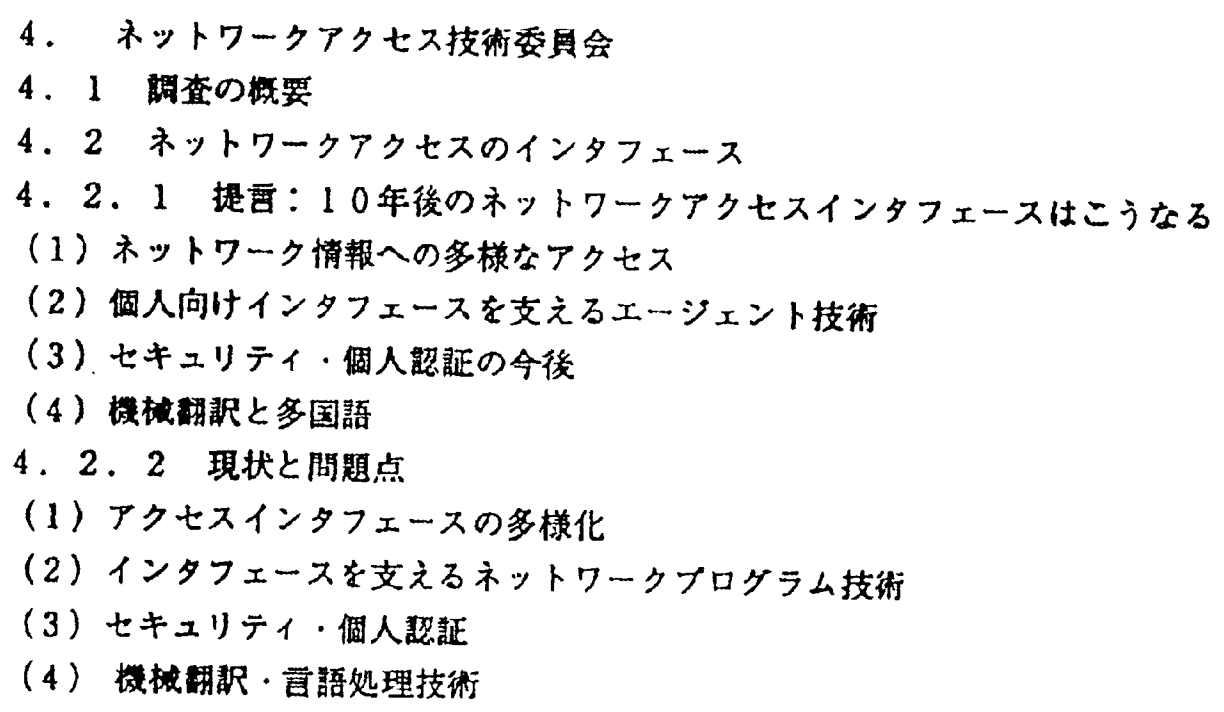

Since it is not appropriate to attach the entire document, only a list of the headings of the input document is shown in FIGS. 5 through 7 for a reference. FIG. 5 shows the headings of Section 4.1 and 4.2 in the appearance order, FIG. 6 shows the heading of Section 4.3 and FIG. 7 shows the heading of Section 4.4.

Figure 8:
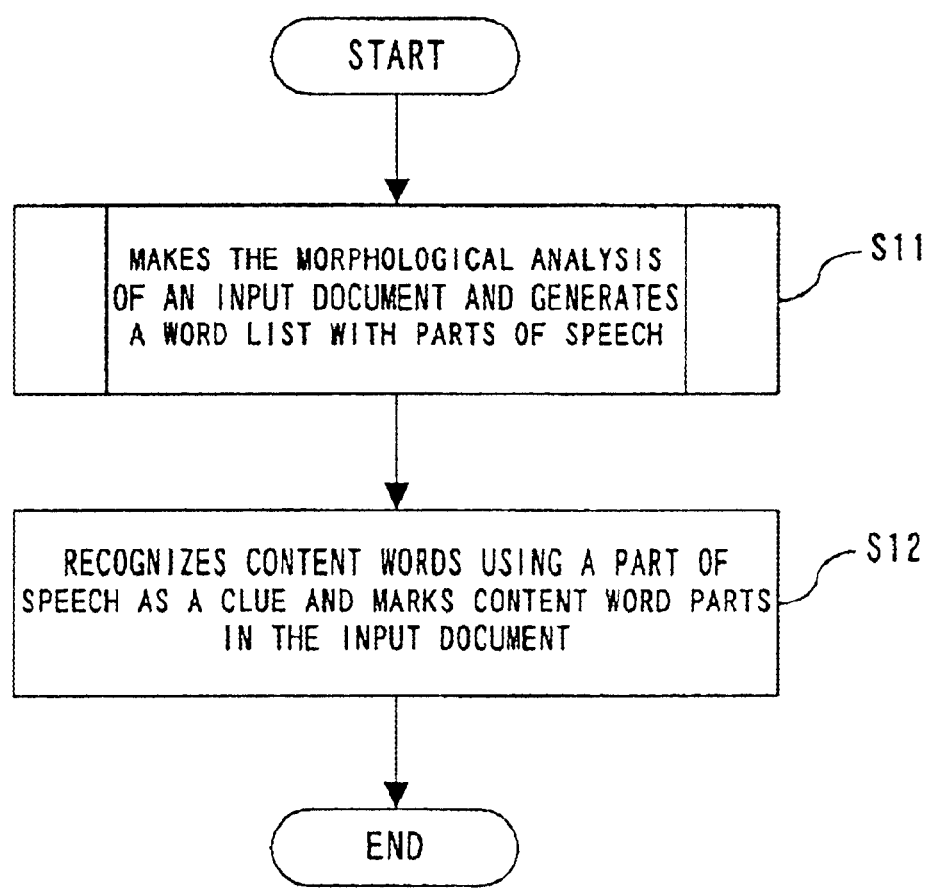
FIG. 8 is a flowchart showing a tokenization process.
Figure 9:
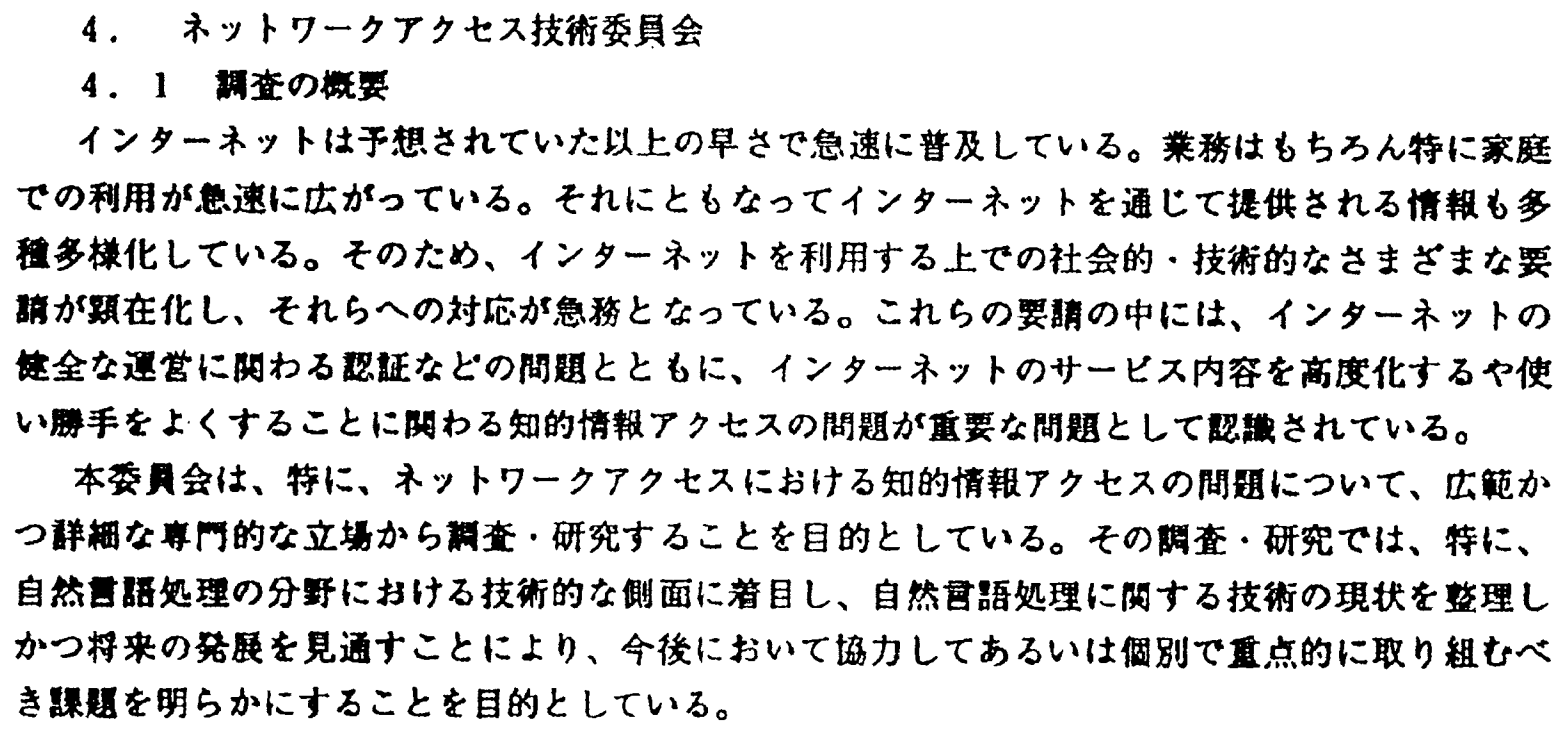
Figure 10:
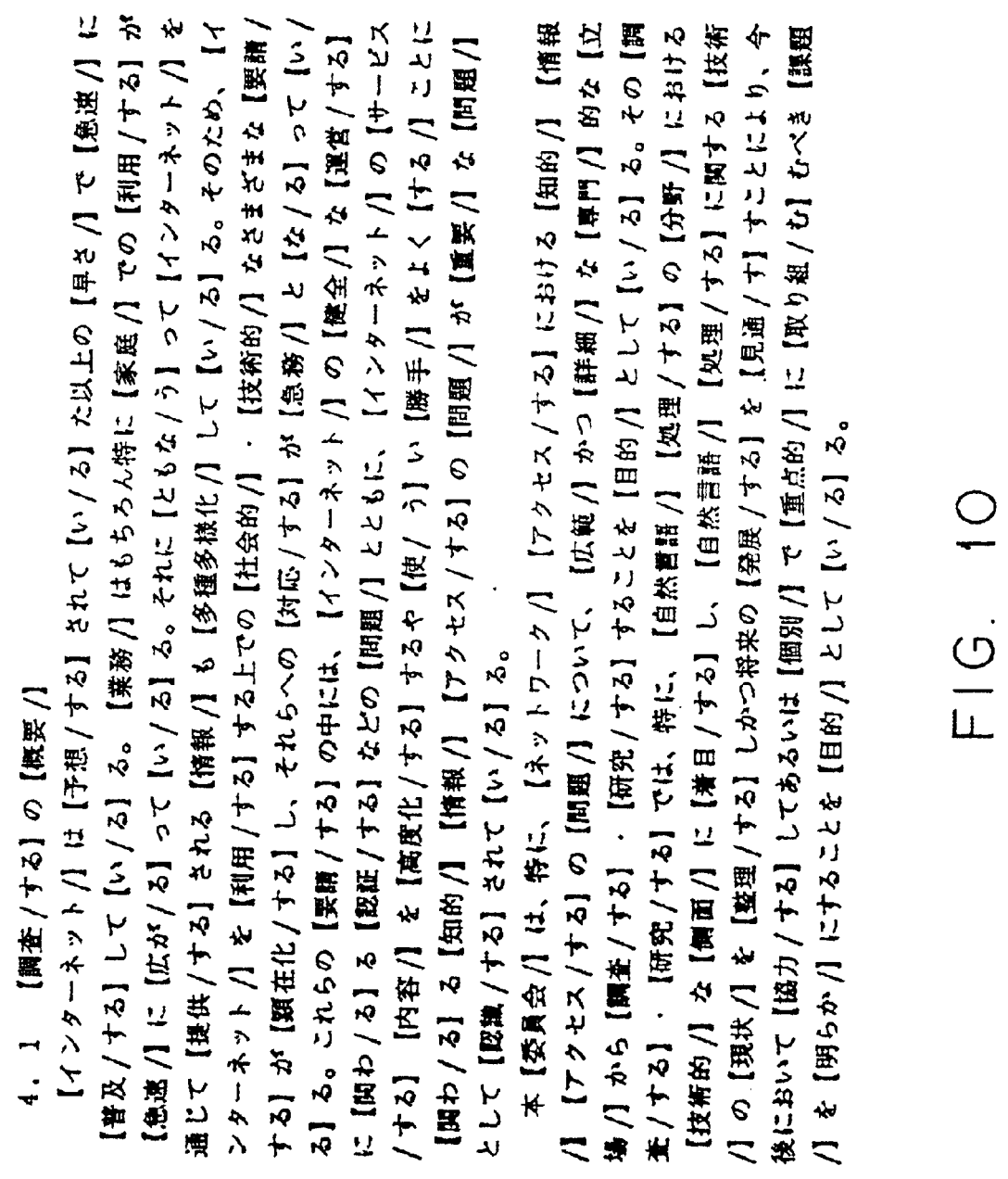

FIG. 8 is a flowchart showing a tokenization process by the tokenizer 22. The tokenizer 22 first performs a morphological analysis on the input document and generates a word list with the names of parts of speech (step S11). Then, the tokenizer 22 detects contents words (noun, verb, adjective and adjective verb) using the part of speech as a clue, attaches a mark to the part of the document corresponding to the content word (step S12), and the process is terminated. FIG. 9 shows the beginning part of the input document, and FIG. 10 shows the corresponding outputs from the tokenizer 22.

Figure 11:
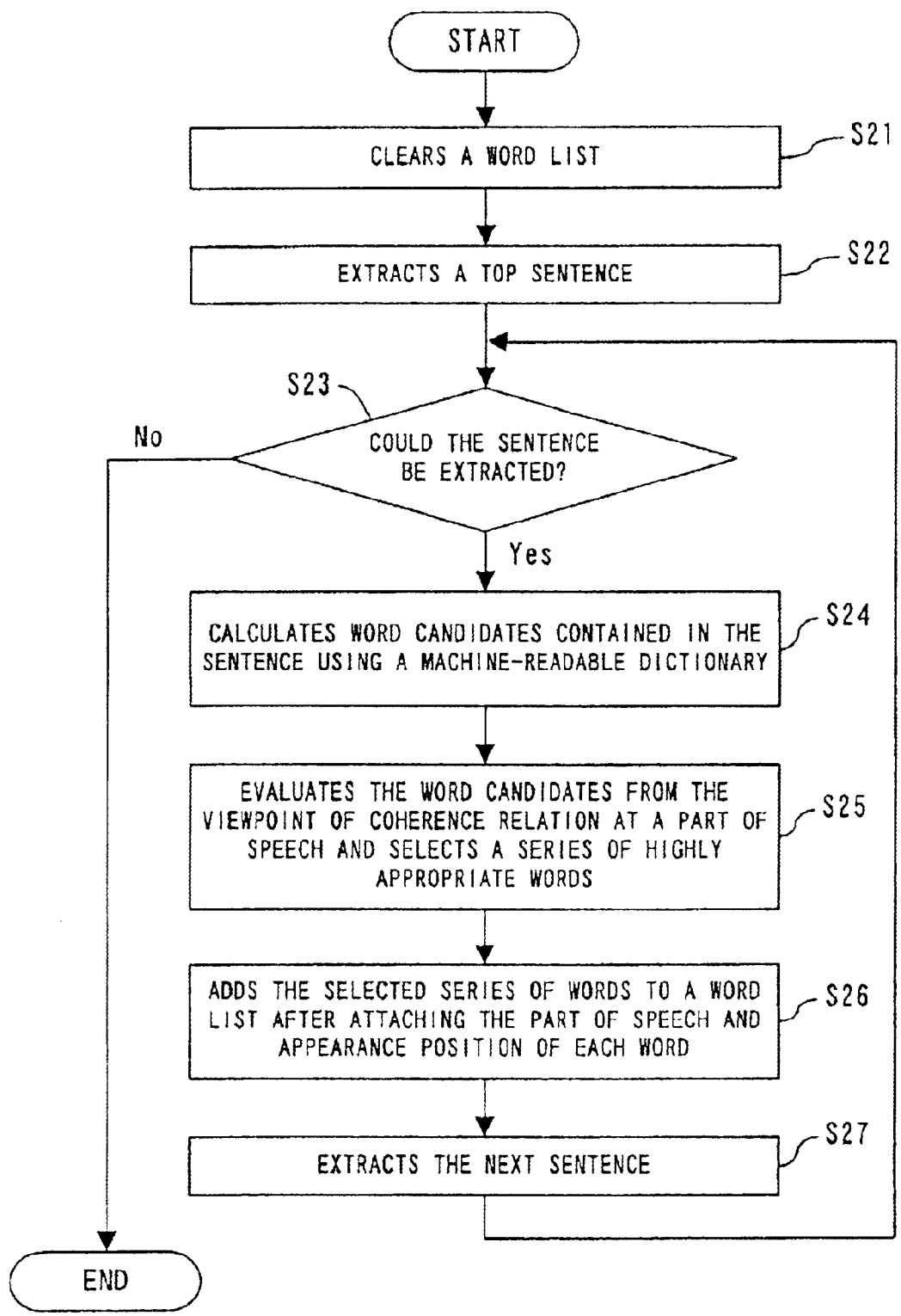
FIG. 11 is a flowchart showing a morphological analysis process.

In step S11 shown in FIG. 8, the morphological analyzer 23 performs a morphological analysis as shown in FIG. 11. The morphological analyzer 23 first clears the word list (step S21), attempts to extract a sentence with the clue of a period, etc., from the beginning part of the document (step S22), and judges whether a sentence could be extracted (step S23).

After a sentence is extracted, word candidates used in the sentence are extracted by referring to the machine-readable dictionary 24 (step S24). In the case of Japanese, as shown in FIG. 9, since boundaries between words are not structurally defined, all words corresponding to the partial character string contained in the sentence are extracted as candidates. For example, if a sentence "東京都は大都市だ" is extracted, as shown in FIG. 12, all partial character strings of this sentence become word candidates.

On the other hand, in the case of English, since boundaries between words are clearly indicated by a space, the main process is to calculate the candidates for the parts of speech of words corresponding to character strings separated by a space. For example, if a sentence "Tokyo is the Japanese capital." is extracted, as shown in FIG. 13, the basic form and part of speech of the five words contained in the sentence are calculated.

Then, the morphological analyzer 23 selects an appropriate series of words from the viewpoint of adjacency probability at a part-of-speech level (step S25), attaches the information of the part of speech and the appearance position to the selected series of words, and adds the words to the word list in the appearance order (step S26). Then, a subsequent sentence is attempted to be extracted (step S27), and the processes in steps S23 and after are repeated. Then, if no sentence can be extracted in step S23, the process is terminated.

In the tokenization result shown in FIG. 10, words put in brackets ([ ]) are content words detected by the morphological analyzer 23. If the content word is a conjugation word (verb or adjective), parts before and after a slash (/) in the brackets ([ ]) indicate the stem and the conjugated ending in a base-form, respectively, and they are used to distinguish words in a later process. It is enough for this purpose to attach both the part of speech and the conjugation can also be attached instead of the information. In short, arbitrary information can be used, only if it is identification information for distinguishing a pair of words which cannot be distinguished only by the stem, such as "い/る" and "い/く".

In step S25, as a method for evaluating the propriety of a series of words, a variety of morphological analysis methods are known, of which any can be used. For example, a method for evaluating the propriety of a series of words using appearance probability estimated by training data is reported, (Eugene Charniak, "Hidden Markov and Two Applications", Statistical Language Learning, Chapter 3, pp. 37–73 (The MIT Press. 1993)); Masaaki Nagata, "A Stochastic Japanese Morphological Analyzer Using a Forward-DP Backward-A*N-best Search Algorithm", in the Proceedings of COLING '94, pp. 201–207, 1994; and Masaaki Nagata, "A Stochastic Japanese Morphological Analyzer Using a Forward-DP Backward-A*N-best Search Algorithm", SIG Notes NL-101-10, the Institute of Information Processing, May 1994).

Although in the example shown in FIG. 10, the tokenizer 22 extracts all content words, a target to be extracted can also be restricted to only a noun. If an English document is processed as a target, the words can also be extracted from all words separated by a space, by removing a word which appears anywhere, regardless of a topic (functional words, such as an article, preposition, etc., and words which appear with a particularly high frequency), instead of executing a morphological analysis process. Such a process can be realized if a stop word list for storing functional words and words which appear with a particularly high frequency is used instead of the machine-readable dictionary 24.

Next, the process of the topic structure detector 25 is described. In this preferred embodiment, it is assumed that topic passages are detected based on the technology disclosed by the prior Japanese Patent Application No. 10-072724, "Summary Generator and Method thereof". According to this method, the hierarchical structure of topics is detected as follows.

1. Estimation of Topic Boundary Position

A section in which there seems to be a topic boundary is calculated as a topic boundary candidate section based on cohesion degree calculated using a specific window width. This process is repeated for a plurality of window widths of different sizes, and a series of topic boundary candidate sections that divide the source text into severed topic passages of apploximately same size are detected accordingly to a window width, from those correspond to the breaks of major topics up to those correspond to the breaks of local topics.

2. Detection of Hierarchical Structure of Topics

The topic boundary candidate sections calculated using different window widths are unified, and both the hierarchical structure of topics and the position of each topic boundary is determined.

In this preferred embodiment, the detection process of the hierarchical structure of topics is simplified and a final topic boundary position is determined by a leading sentence detection process by the leading sentence extractor 27, which is described later.

Figure 14:
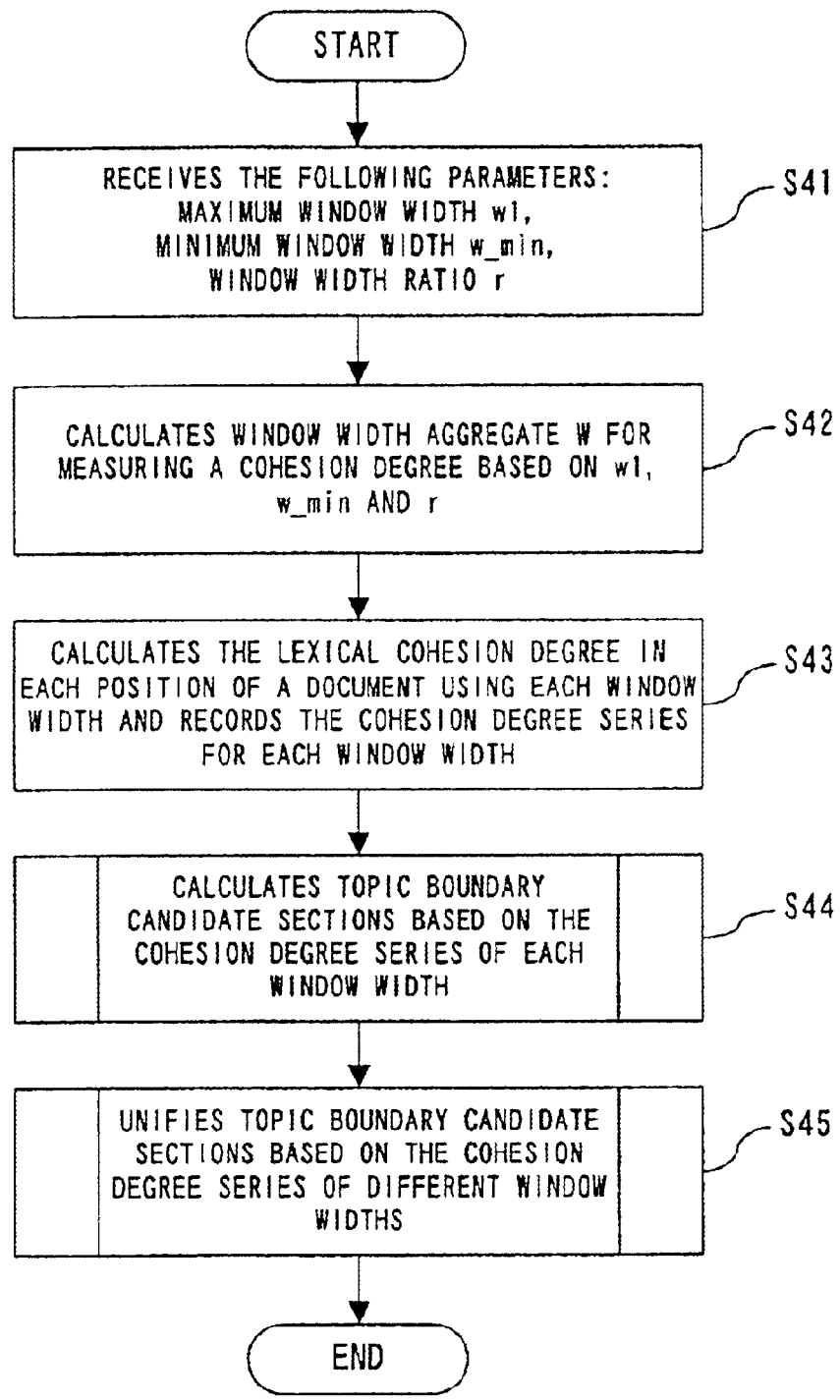
FIG. 14 is a flowchart showing a topic structure detection process.

FIG. 14 is a flowchart showing a topic structure detection process by the topic structure detector 26. The topic structure detector 26 first receives three parameters: the maximum window width $w_1$, the minimum window width $w_{min}$ and a window width ratio r from a user (step S41) and calculates the aggregate of window widths W for measuring cohesion (step S42). In FIG. 14, the suffix of a symbol "$w_{min}$" is described with an underscore as in "w_min", taking the ease of viewing the diagram into consideration. The aggregate of window widths W is produced by collecting terms larger than $w_{min}$ from a geometrical progression with both an initial term of $w_1$ and a common ratio of 1/r.

It is practically sufficient if at this time approximately ½ to ¼ of an entire document is given for the maximum window width $w_1$, a size of approximately a paragraph (for example, 40 words) is given for the minimum window width $w_{min}$, and 2 is given for the window width ratio r. Therefore, $w_1$=5,120 (words), $w_{min}$=40 (words) and r=2 are used in the following description.

Next, as shown in FIG. 10, the topic structure detector 25 calculates the cohesion degree of each position in a document for each window width in W based on the document of which the content words are marked, and records the cohesion degree as a series of cohesion degrees (step S43).

In this example, the topic structure detector 25 first compares a vocabulary (in this example, content words) which appears in two windows set up before and after each position (reference point) of a document, calculates a value which increases as the number words in a common vocabulary increases and designates the value as a cohesion degree in the position. Then, the topic structure detector 25 repeats the calculation of cohesion degree while sliding the positions of the windows by a specific interval width tic from the beginning toward the end of the document, and records the calculated cohesion degree as a series of cohesion degrees moving from the beginning toward the end of a document.

There is no problem caused by an interval width tic only if a tic is smaller than a window width. However, in this example, a tic is assumed to be ⅛ of the window width taking process efficiency into consideration. This tic value can also be designated by a user.

Although for the calculation method of cohesion degree, there are a variety of methods, and a cosine measure which has been widely used as an index for a lexical similarity in a field of information retrieval, etc., is used below. This cosine measure is calculated according to the following equation.

$$sim(b_l, b_r) = \frac{\Sigma_t w_{t,b_l} w_{t,b_r}}{\sqrt{\Sigma_t w_{t,b_l}^2 \Sigma_t w_{t,b_r}^2}} \quad (1)$$

In this equation, $b_l$ and $b_r$ represent a left block (a block on the backward side of a document) and a right block (a block on the forward side of the document), respectively, and $w_{t,bl}$ and $w_{t,br}$ represent the appearance frequencies of word t in the left and right blocks, respectively. $\Sigma_t$ in the right-hand side of equation (1) is a summation operator of word t.

The more vocabulary common to both the blocks, the greater the similarity degree of equation (1) (maximum 1). Conversely, if there is no common vocabulary, the similarity degree becomes the minimum value 0. Specifically, a large value of the similarity degree indicates a high possibility that a common topic is handled in both the blocks, while a small value of the similarity degree indicates a high possibility that the point between the blocks is a topic boundary.

Figure 15:
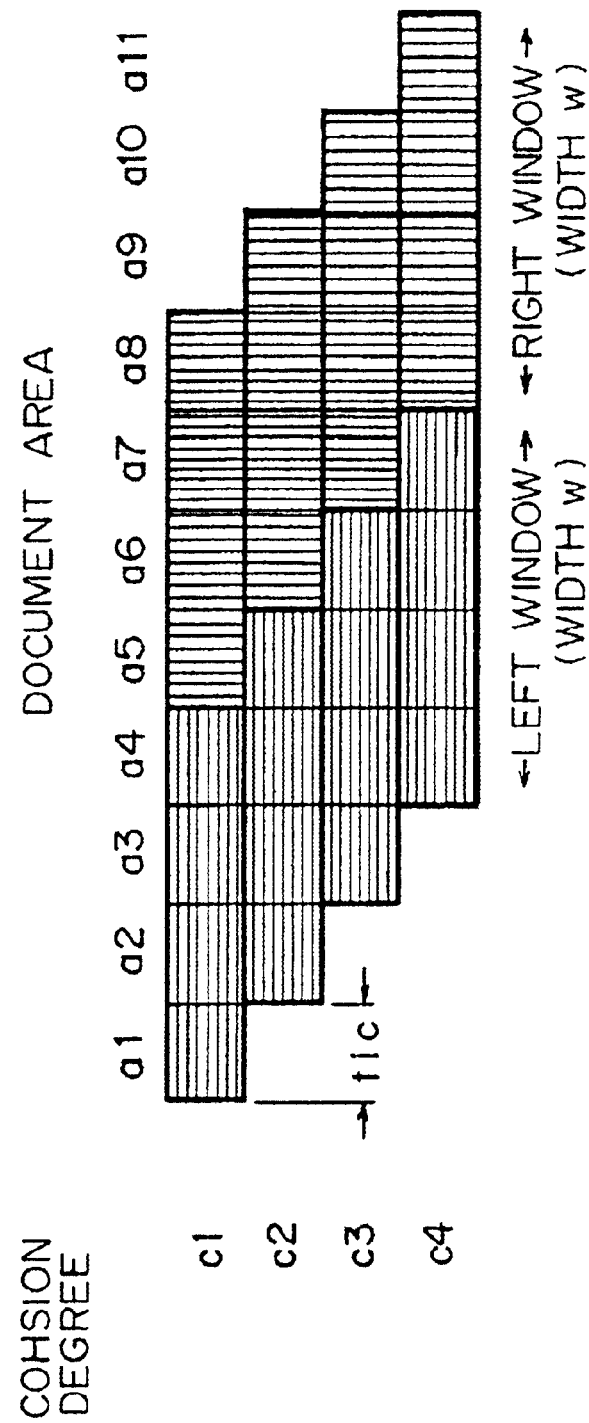
FIG. 15 shows a series of cohesion degrees.

FIG. 15 shows a series of the cohesion degree recorded in step S43. In this example, ¼ of a window width w is used for an interval width tic, and document areas a1–a11 are areas with a width corresponding to the interval width tic. c1 represents the cohesion degree of a window width w calculated using a boundary between a4 and a5 in the document as a reference point. Specifically, c1 is a cohesion degree calculated using a part of document areas a1–a4 and a part of document areas a5–a8 as ranges of left and right windows, respectively.

c2 represents a cohesion degree calculated after the window is slid rightward by the window width tic, and is the cohesion degree of a window width w with a boundary between a5 and a6 used as a reference point. The collection of c1, c2, c3, c4, ..., calculated in this way after the window is sequentially slid by the window width tic is called the cohesion degree series of the window width w moving from the beginning of the document toward the end.

Figure 16:
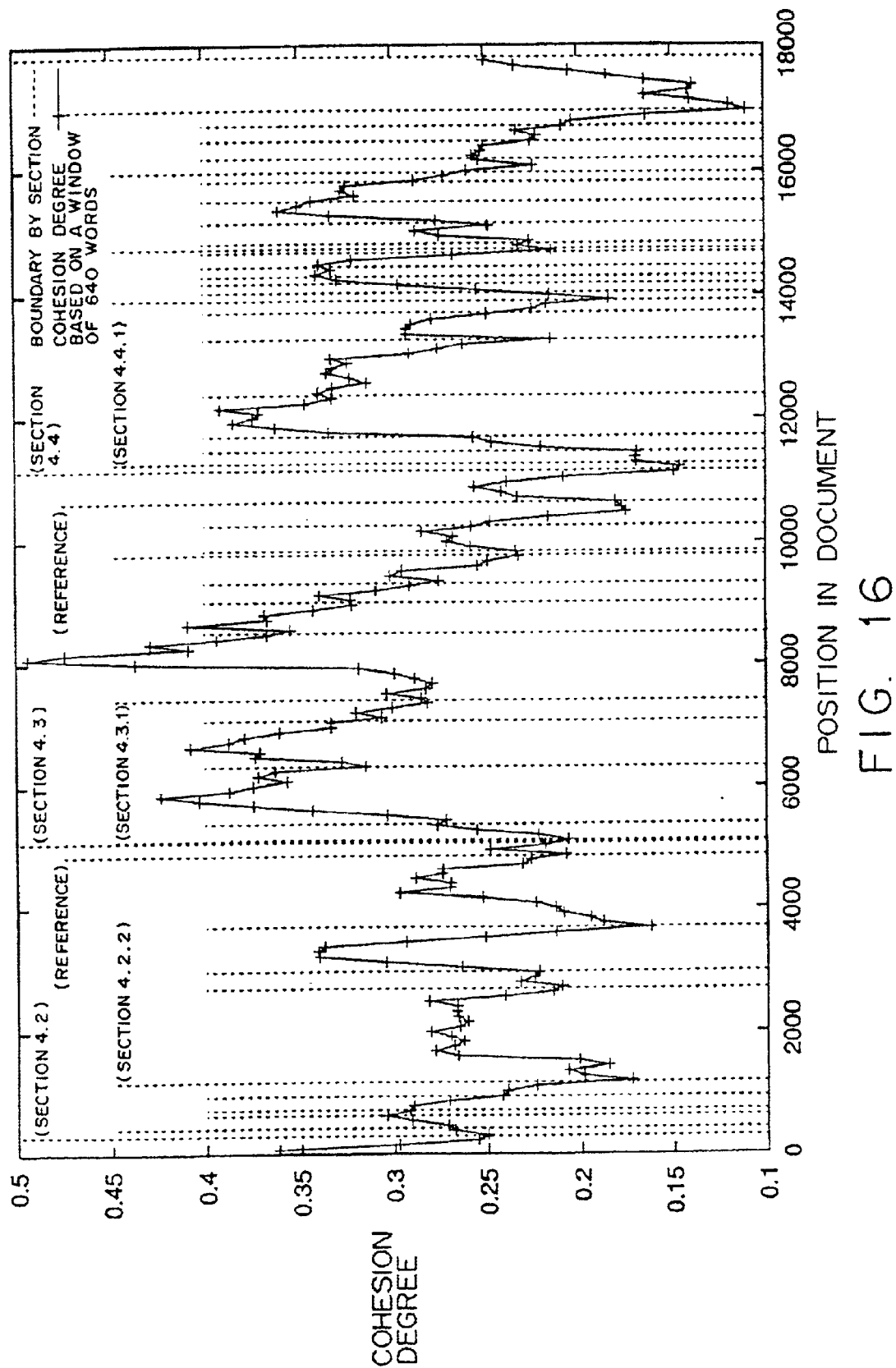
FIG. 16 shows a cohesion distribution.

FIG. 16 is a graph on which the cohesion degree series of a window width of 640 words are plotted against the total number of content words used between the beginning of a document and each reference point on the horizontal axis. For example, in the case of the cohesion degree c2 shown in FIG. 15, the total number of content words in areas a1–a5 becomes the position of a reference point in the document. In this example, cohesion degrees are calculated from the beginning of the document toward the end using ⅛ of the window width of 640 words (80 words) as an interval width tic.

Then, the topic structure detector 25 analyzes a cohesion degrees series of each window width using the topic boundary detector 26, which is a sub-module of the topic structure detector 25, and detects a section with a low cohesion degree as a topic boundary candidate (step S44).

Although, as shown in FIG. 16, a minimal point in a cohesion degrees series often corresponds to an actual topic boundary (boundary of a section indicated by a dotted line), all minimal points do not always correspond to the topic boundaries. The topic boundary detector 26 estimates only the section including the boundary position of a topic passage approximately the same size as the window width of each cohesion degree series using the minimal points of a cohesion degree series as a clue. In this embodiment, this process is realized by a moving average method.

Then, the topic structure detector 25 relates topic boundary candidates which are calculated based on cohesion degree series of different window widths to one another and outputs the topic boundary candidates (step S45). Here, the topic structure detection process is terminated.

Next, the topic boundary detection process in step S44 shown in FIG. 14 is described using FIGS. 15 and 17. A moving average method used in this example is widely used to remove fine fluctuations and to detect a more general tendency in a time series analysis, which is the statistical analysis of a stock price fluctuation, etc. In this embodiment, the moving average method is used not only to ignore the fine fluctuations of the moving average values of the cohesion degree series, but is also used as a direct clue to detect topic boundary candidate sections (sections with a low cohesion degree) by considering the moving average value of the cohesion degree series as both the forward cohesion force at the start point of a moving average zone and the backward cohesion force at the end point of the moving average zone.

As described earlier, FIG. 15 shows a relation between cohesion degree series c1–c4 and document areas a1–a11. The moving average value of a cohesion degree series is a value obtained by arithmetically averaging n consecutive values in a cohesion degree series, such as (c1+c2)/2 (moving average of two terms), (c1+c2+c3)/3 (moving average of three terms), (c1+c2+c3+c4)/4 (moving average of four terms), etc.

FIG. 17 shows a relation between an example of the moving average of the cohesion degree series shown in FIG. 15 and a document area. In this example, the moving averages of two, three and four terms shown in FIG. 15 are shown for the example of the moving average, and the number of times of use of each document area is shown in the calculation of each moving average. Those values underlined indicate that a corresponding area is used in all the cohesion degree calculations of the moving average.

For example, a value "1" in the upper left corner indicates that a document area a1 is handled once as a part of a left window in the moving average calculation of four terms of c1 to c4. A value "2" on the right-hand side of it indicates that a document area a2 is handled twice as a part of the left window in the moving average calculation of four terms of c1 to c4. The same explanation also applies to other numbers of times of use.

Since a cohesion degree is an index for adacent each other at a point the strength of a relation between parts a moving average value calculated using a cohesion degree c1, obtained by including an area a1 in a left window, also indicats whether the area a1 is related rightward.

In other words, a moving average value indicates how strongly the area in the left window part of moving-averaged cohesion degrees (a1 to a7 against the four-term average of c1 to c4) is pulled rightward (forward cohesion force). On the other hand, conversely, it also indicates how storongly the area in the right window part of moving-averaged cohesion degrees (a5 to all against the four-term average of c1 to c4) is pulled leftward (backward cohesion force).

As for the relation between a cohesion force and each document area is considered, it is considered that the contribution of an area to a cohesion force score should increase according to the number of times the area is handled in an window when the cohesion force score and thus the corresponding average cohesion degrees are calculated. It is generally considered that the more closely a target word is repeated, the stronger the lexical cohesion is. Therefore, it is also considered that the nearer on area locates the reference point of moving-averaged cohesion degrees (boundary position of left and right windows), the greater the contribution of the area to the moving average is.

For example, in the moving average of the four terms shown in FIG. 17, the reference points of a cohesion degree are four of a boundary between a4 and a5, a boundary between a5 and a6, a boundary between a6 and a7 and a boundary between a7 and a8. In this case, it is found that a4 is most frequently included in the left window, and is the nearest to these reference points. It is also found that a8 is most frequently included in the right window, and is the nearest to these reference points. Accordingly, areas having the strongest relation to the moving average value are a4 and a8 for the left and right windows, respectively.

In the same way, a4 and a7 are selected for areas having the strongest relation to the moving average of three terms, of the left and right windows, respectively, and a4 and a6 are selected for areas having the strongest relation to the moving average of two terms, of the left and right windows, respectively. The number of times of use of these areas are marked with backslashes in FIG. 17.

Based on the consideration described above, the topic boundary detector 26 handles the moving average value of a cohesion degree as an index for both a forward cohesion force at the first reference point in a moving-averaged area and a backward cohesion force at the last reference point in the moving-averaged area. For example, the moving average value of four terms of c1 to c4 becomes both a forward cohesion force on a boundary between a4 and a5 and a backward cohesion force on a boundary a7 and a8.

Figure 18:
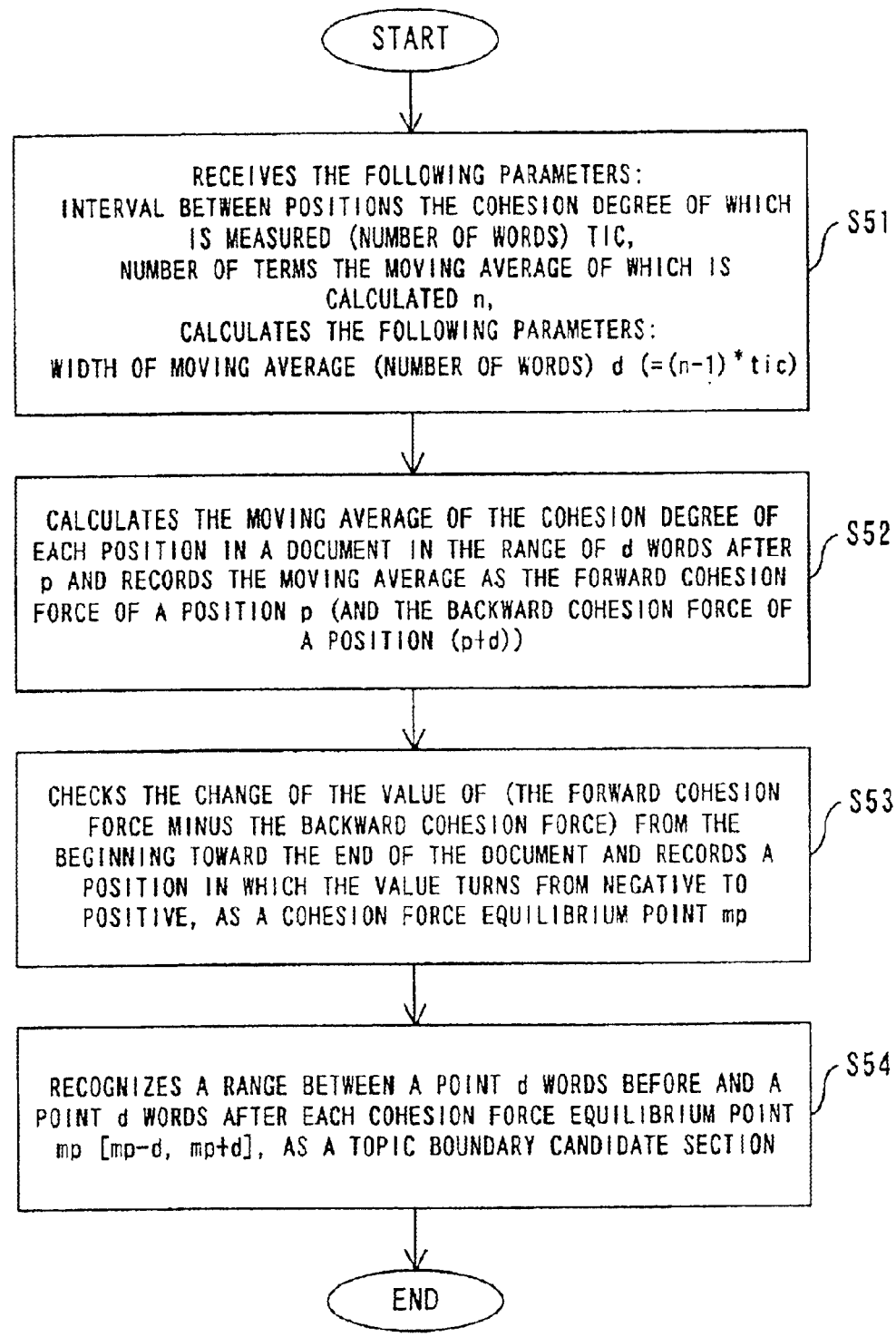
FIG. 18 is a flowchart showing a topic boundary detection process.

FIG. 18 is a flowchart showing the topic boundary detection process by the topic boundary detector 26. The topic boundary detector 26 first receives the interval width tic of a cohesion degree series, and then receives the number of terms n of a moving average from a user (step S51).

For example, an appropriate size of the interval width is ⅛ to ⅒ of a window width w and an appropriate number of terms n is approximately a half of w/tic (4–5). The distance between the first and last reference points of cohesion degrees to be taken a moving average of, is calculated according to an expression (n−1)*tic, which is designated as the width d (words) of the moving average.

Then, the moving average of the cohesion degrees of each position p of the document is calculated within the range from p to p+d and is recorded in the forward cohesion force of a position p (step S52). This value is simultaneously recorded as the backward cohesion force in the end position p+d of the moving-averaged range.

Then, a difference between the forward and backward cohesion forces in each position (forward cohesion force minus backward cohesion force) is calculated from the beginning toward the end of the document based on the recorded forwarded cohesion force, and a point where the difference turns from negative to positive is recorded as a negative cohesion force equilibrium point mp (step S53).

A negative cohesion force equilibrium point is a point in the left part of which a backward cohesion is dominant and in the right part of which a forward cohesion force is dominant. Accordingly, the left and right parts of the point are considered to have a weak relation with each other, and thereby the negative cohesion force equilibrium point becomes a candidate position of a topic boundary.

Then, the range covering the respective d words from immediately before and immediately after the recorded negative cohesion force equilibrium point mp [mp−d, mp+d] is recognized as a topic boundary candidate section (step S54), and the process is terminated.

Figure 19:
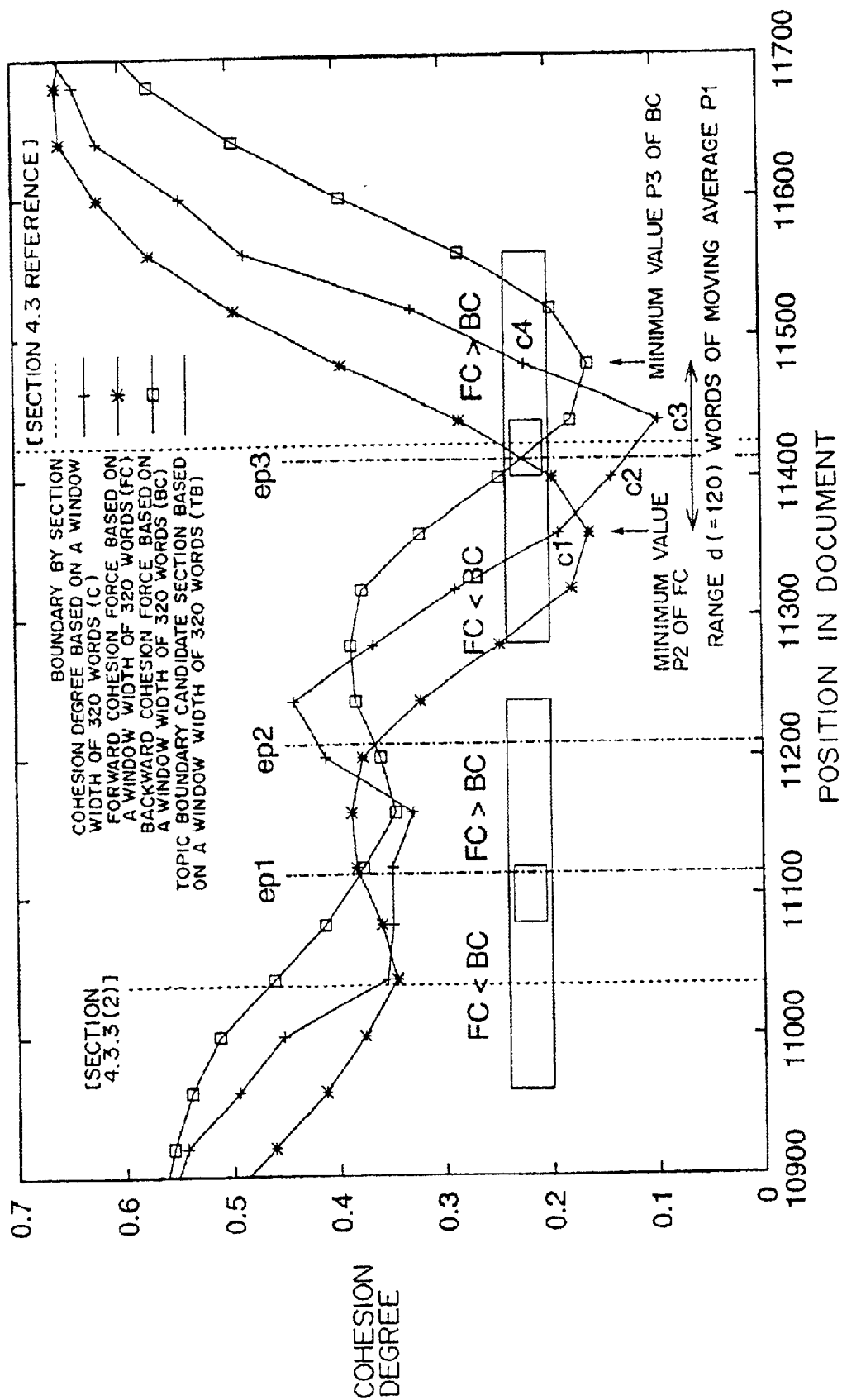
FIG. 19 shows a cohesion force distribution.

Here, the concept of detecting a topic boundary candidate section based on the difference between forward and backward cohesion forces is described using FIG. 19. FIG. 19 shows the distribution of both a cohesion degree and a forward/backward cohesion force measured using a window of a 320-word width in the vicinity of the position somewhere short of the 12,000th word (between the 11,000th and 11,500th word) shown in FIG. 16. For an interval width tic, ⅛ of a window width is used.

In FIG. 19, line charts plotted with a mark +, a mark * and a mark □ indicate a cohesion degree series C, a forward cohesion force FC and a backward cohesion force BC, respectively. The area indicated by a double rectangle which indicates both a topic boundary candidate section and a cohesion force equilibrium point is described later.

ep1, ep2 and ep3, indicated by dotted lines, indicate three points where the difference between forward and backward cohesion forces becomes 0 (cohesion force equilibrium point). On the left side of the first point ep1, a backward cohesion force is dominant over a forward cohesion force, and in the range from the right side of the first point ep1 to the next point ep2, a forward cohesion force is dominant over the backward cohesion force. In the range from the right side of the next point ep2 to the last point ep3, the backward cohesion force is dominant over the forward cohesion force, and on the right side of the last point ep3, the forward cohesion force is dominant over the backward cohesion force.

Therefore, ep1 and ep3 are negative cohesion force equilibrium points where the difference between forward and backward cohesion forces switches from negative to positive, and ep2 is a positive cohesion force equilibrium point where the difference switches from positive to negative.

It is found from these changes of a cohesion force that the left side area of the first point ep1 is pulled toward one part further on the left side, both side areas of a middle point ep2 are pulled toward ep2 and the right side area of the last point ep3 is pulled toward one part further on the right side. Actually, a cohesion degree plotted with forward/backward cohesion forces becomes a minimum in the vicinities of both ep1 and ep3, and becomes a maximum in the vicinity of ep2. In this way, the change of a forward/backward cohesion force and the change of a cohesion degree are closely related to each other.

For example, a part P1 indicated by a horizontal arrow in the vicinity of a cohesion force equilibrium point ep3 shown in FIG. 19 is one part of the minimal cohesion degree. Thus, the moving average value of this part P1 (in this example, four-term average of c1 to c4) usually becomes a minimum as indicated by cohesion forces at both P2 and P3. However, if there are fine fluctuations in the range narrower than the area for which a moving-average is to be calculated, the moving average value, that is, cohesion force does not always become a minimum due to the smoothing operation of a moving average.

Since a forward cohesion force is a moving average value plotted at the start position of an area for which a moving average is to be calculated, the minimal position of a forward cohesion force is on the left side of the minimal position of a cohesion degree. For the same reason, the minimal position of a backward cohesion force is on the right side of the minimal position of the cohesion degree. Thus, if the fluctuations of a cohesion degree is sufficiently large, a cohesion force equilibrium point is generated in an area where a moving average is calculated.

Figure 20:
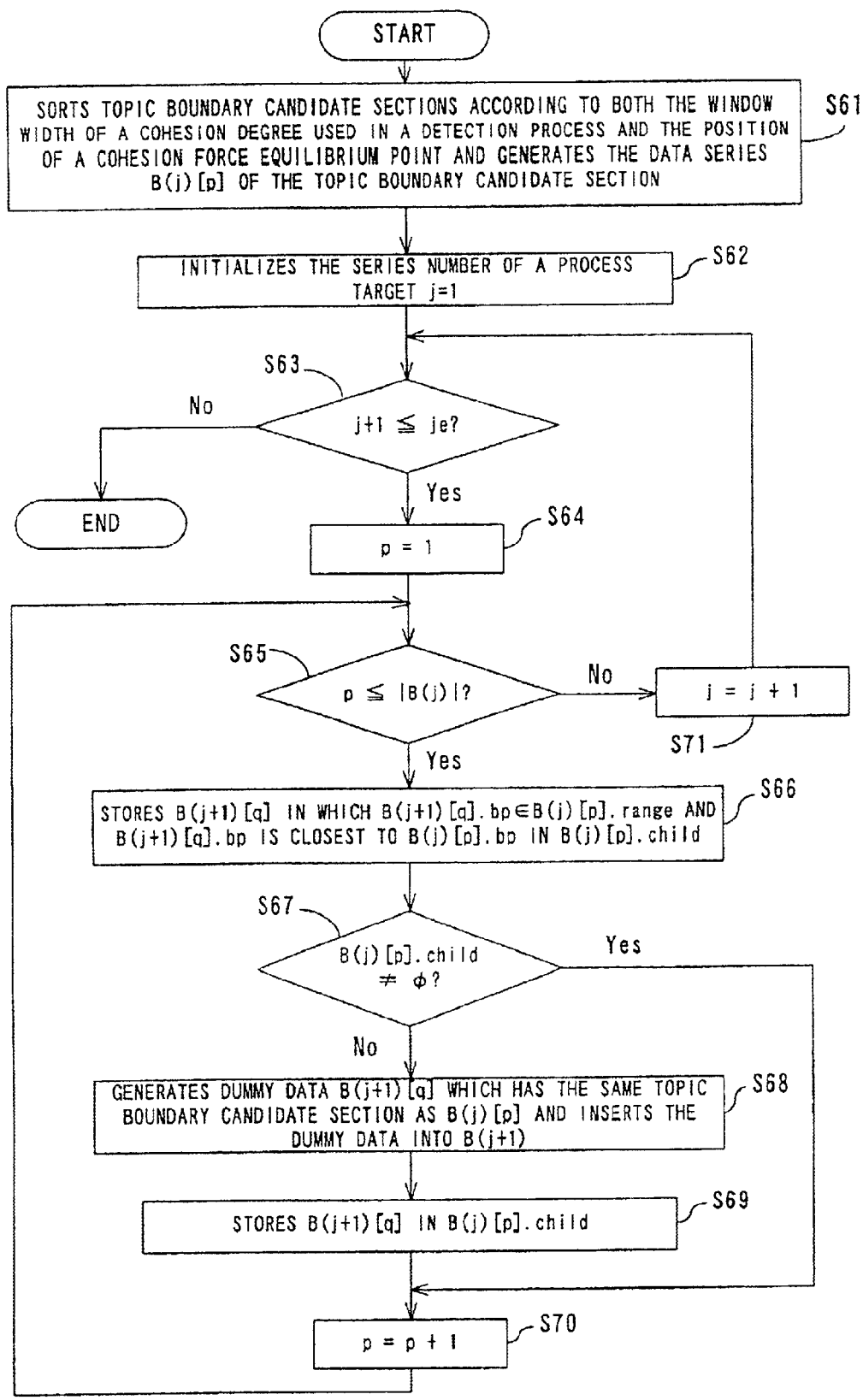
FIG. 20 is a flowchart showing a topic boundary candidate section unification process.

FIG. 20 is a flowchart showing the topic boundary unification process in step S45 shown in FIG. 14. The topic structure detector 25 first sorts and groups detected topic boundary candidate sections using both the window width of a cohesion degree series used to detect them and the appearance position in a document of the equilibrium point of the topic boundary candidate section and generates a topic boundary candidate section data series B(j)[p] (step S61).

Here, a control variable j is a series number for indicating that data are detected by a cohesion degree series of a window width $w_j$, and a control variable p is a data number for indicating each topic boundary candidate section in the series. Actually, j takes values, such as 0, 1, 2, . . . , in descending order of window width, and p takes values, such as 1, 2, . . . , in the appearance order of cohesion force equilibrium points. Data B(0) corresponding to a series number 0 are special data generated in correspondence with an entire document, and the topic boundary candidate sections are set up independently of the cohesion degree series. Each of data B(j)[p] includes the following element data.

B(j)[p].range: Topic boundary candidate section, a set of (start position, end position)

B(j)[p].bp: Cohesion force equilibrium point

B(j)[p].child: Topic boundary candidate section of B(j+1) series which matches the B(j)[p] in the range of topic boundary candidate sections in a boundary position (child candidate section)

Here, although a cohesion force equilibrium point is theoretically a point, since it is detected as a point where the sign of the difference between forward and backward cohesion forces switches over, as described earlier, it is actually a set of a point where the difference is negative (start position) and a point where the difference is positive (end position). Therefore, in this preferred embodiment, a point bp where the difference between forward and backward cohesion forces becomes 0 is calculated by interpolation according to the following equation, and is used as a cohesion force equilibrium point.

$$bp=(DC(rp)*lp-DC(lp)*rp)/(DC(rp)-DC(lp)) \quad (2)$$

where lp and rp are the start and end positions of a cohesion force equilibrium point, respectively, and DC(lp) and DC(rp) are the value of (forward cohesion force minus backward cohesion force) at those positions, respectively.

Then, the obtained bp is designated to be B(j)[p].bp.

Then, the topic structure detector 25 relates topic boundary candidate section data with different window widths to one another. Hereafter, a collection of the data B(j)[p] that belong to a series is referred by B(j). Furthermore, the process is described below using the following notation.

je: Series number corresponding to the minimum window width $w_{min}$

|B(j)|: Maximum value of data number p in B(j)

First, a series number j for indicating a process target is initialized to 1 (step S62). Thus, the series of a topic boundary candidate section obtained using the maximum window width $w_1$ is designated as a process target. Then, a unification process that unifies each datum in the process target with an datum in a series of B(j+1) is performed while incrementing j as long as j+1≦je.

In this unification process, for each topic boundary candidate section data B(j)[p] (p=1, . . . , |B(j)|) in the series to be related, a datun in which B(j+1)[q].bp is closest to B(j)[p].bp is selected and stored in B(j)[p].child as unified boundary candidate section data.

The details of the procedures are as follows. First, j+1 and je are compared (step S63). If j+1≦je, 1 is assigned to p (step S64), and p and |B(j)| are compared (step S65). If p≦|B(j)|, unification processes in steps S66 and after are performed. If p exceeds |B(j)|, j=j+1 is assigned (step S71), and processes in steps S63 and after are repeated.

In step S66, the topic structure detector 25 selects data in which B(j+1)[q].bp∈B(j)[p].range and in which B(j+1)[q].bp is closest to B(j)[p].bp among the candidate data B(j+1)[q] (q=1, . . . , |B(j+1)|) unified as the datum to be unified and stores in B(j)[p].child.

Here, the condition of B(j+1)[q].bp∈B(j )[p].range indicates that the topic boundary candidate section of B(j)[p] includes the cohesion force equilibrium point of B(j+1)[q].

Figure 21:
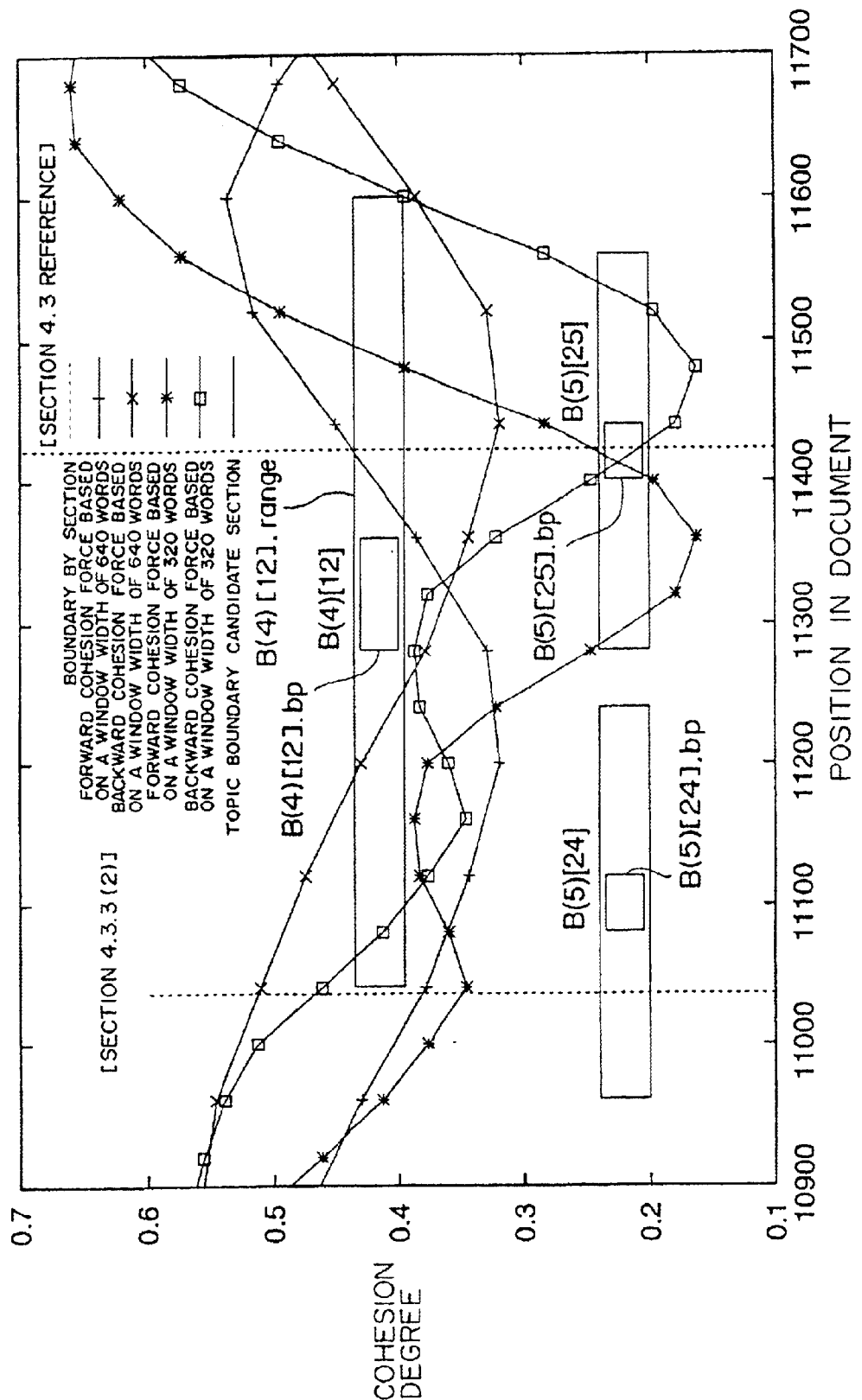
FIG. 21 shows data to be unified.

FIG. 21 shows a selection example of data to be unified. In FIG. 21, line charts plotted with marks + and x indicate forward and backward cohesion force series, respectively, based on a window width of 640 words corresponding to a process target. Line charts plotted with * and □ indicate forward and backward cohesion force series, respectively, based on a window width of 320 words corresponding to a unification target.

Out of areas indicated by a double rectangle, a large rectangular area and a small rectangular area included in the large rectangular area correspond to a topic boundary candidate section and a cohesion force equilibrium point, respectively. In this example, a cohesion force equilibrium point is indicated as a small section separated by both start and end positions.

For example, if a datum to be processed is assumed to be B(4)[12], the topic boundary candidate section B(4)[12].range includes the cohesion equilibrium points B(5)[24].bp and B(5)[25].bp of two pieces of data in a series to be unified. Thus, both B(5)[24] and B(5)[25] become candidates for data to be unified. Since out of these, B(5)[25] is closer to the cohesion force equilibrium point of the data to be processed B(4)[12].bp, B(5)[25] is selected as data to be unified.

Then, the topic structure detector 25 judges whether a datum to be unified could be selected (step S67). If B(j)[p].child is not empty, it is judged that datum to be unified could be selected. If B(j)[p].child is empty, it is judged that the datum to be unified could not be selected. Then, if the datum to be unified could be selected, p=p+1 is assigned (step S70), and the processes in steps S65 and after are repeated.

If the datum to be unified could not be selected, a pseudo-datum (dummy datum) B(j+1)[q] to be unified having the same topic boundary candidate section as that of B(j)[p] is generated and inserted in the series of B(j+1) (step S68).

In step S68, first, the values of B(j+1)[q].range and B(j+1)[q].bp are assigned to both B(j+1)[q].range and B(j+1)[q].bp, and new data B(j+1)[q] are generated. Then, the generated data B(j+1)[q] are inserted in a position where B(j+1)[q−1].bp<B(j+1)[q].bp and B(j+1)[q].bp<B(j+1)[q+1].bp in the series B(j+1).

Thus, the data number q of the pseudo-datum is determined, and the data numbers of existing data after that are rewritten. The reason why pseudo-topic boundary candidate section data are generated is that in processes after this, leading sentences are extracted from all topic boundary candidate section data in a specific series of B(j).

Then, the generated dummy datum B(j+1)[q] is stored in B(j)[p].child (step S69), and processes in steps S70 and after are performed. Then, if in step S63, j+1 exceeds je, the process is terminated.

Finally, for the data of each series number j among all series numbers less than je, the data of a series number j+1 having a cohesion force equilibrium point in the topic boundary candidate section are set in B(j)[p].child. Therefore, a plurality of levels of topic boundary candidate section data are unified in a chain form.

Figure 22:
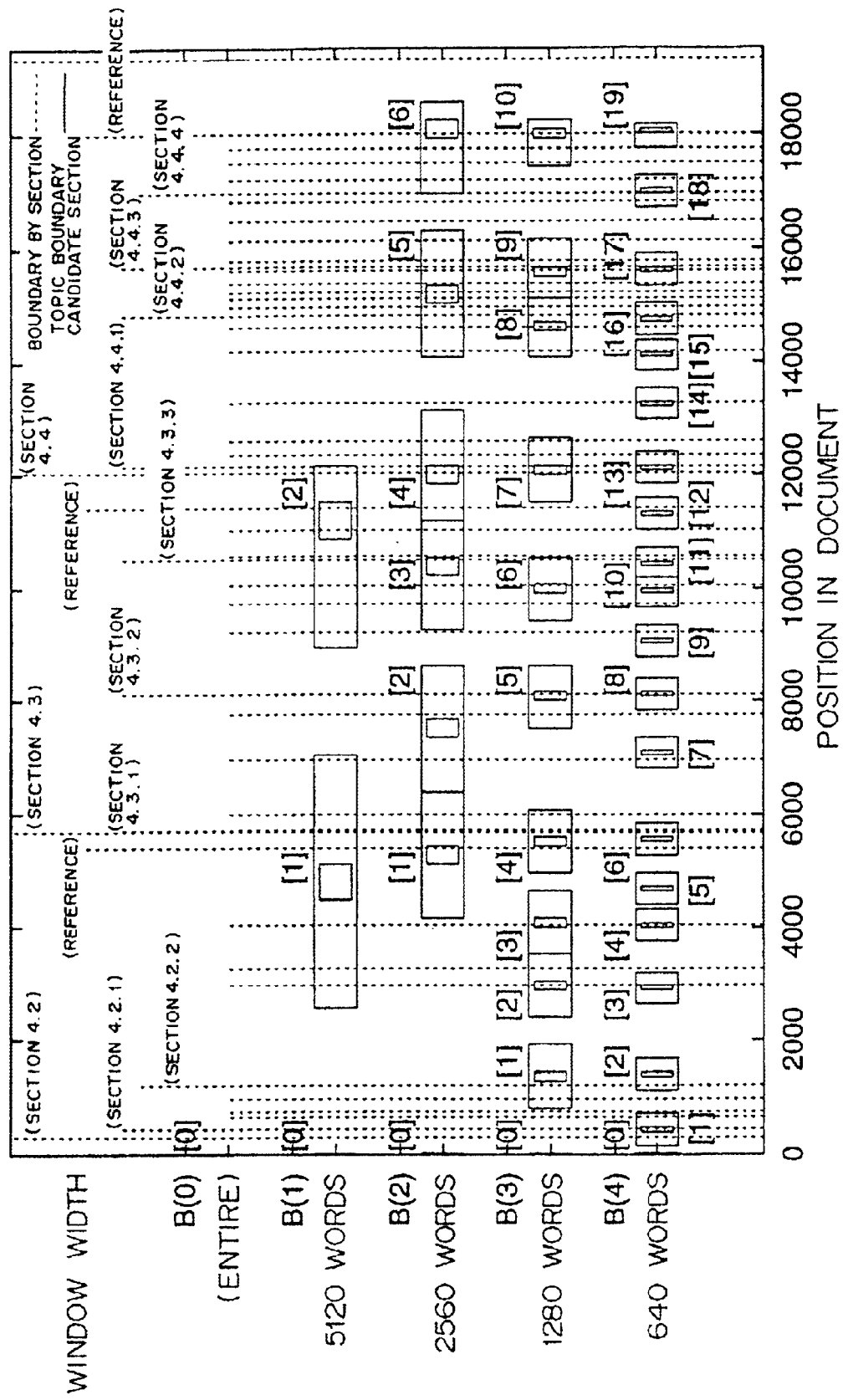
FIG. 22 shows the first detection result of a topic structure.

FIG. 22 shows the detection result of topic boundaries obtained in this way. In FIG. 22, out of areas indicated by double rectangles, a large rectangular area corresponds to a topic boundary candidate section, and a small rectangular area included in the large rectangular area corresponds to cohesion force equilibrium points. B(1), B(2), B(3) and B(4) represent series corresponding to the window widths of 5,120 words, 2560 words, 1,280 words and 640 words, respectively, and numbers attached to the double rectangles [1], [2], . . . , indicate the data number in each series.

The boundary data of number [0] corresponding to the start position of an entire document are added to each series to extract the leading sentence for a topic passage at the beginning of a document, in particular a leading sentence for an entire document (B(0)). The width of the topic boundary candidate section of data of number [0] of any series is set to approximately a moving average width based on the minimum window width (25 words).

In the detection result shown in FIG. 22, a tendency that the larger the window width based on which a boundary is detected, the larger the topic the break of which the boundary corresponds to, can be found. For example, the topic boundaries based on the maximum window width (5,120 words) correspond well to the start position of the biggest sections, such as sections 4.3 or 4.4, and the topic boundaries based on the second largest window width (2,560 words) correspond well to the second biggest sections, such as sections, 4.3.1, 4.3.2, etc.

The process of the leading sentence extractor 27 is described next. Roughly speaking, there are two kinds of processes in the process of the leading sentence extractor 27. The first process is a leading sentence detection process, and detects the leading sentence of each of the topic passages which has been detected by the topic structure detector 25 and determines a boundary position. The second process is a leading sentence extraction process, and adjusts the grading of a topic to be taken into a summary according to the output amount of the summary.

For each of the topic boundary candidate sections detected by the topic structure detector 25, the leading sentence extractor 27 identifies a sentence located in the position where the next topic starts, from sentences in the topic boundary candidate section. Then, the leading sentence extractor 27 markes this sentence as the leading sentence of the first kind (boundary sentence).

Then, the leading sentence extractor 27 records the position of this boundary sentence as the start position of the introductory part of the topic and recognizes a part after the boundary sentence in the candidate section as the introductory part. Then, the leading sentence extractor 27 selects a sentence at which the degree of relation to the topic passage becomes a maximum as the leading sentence of the second kind (topic introductory sentence).

The leading sentence extractor 27 uses two kinds of relation degrees, a forward relation degree and a backward relation degree, in order to detect both the boundary sentence and topic introductory sentence. A forward relation degree is an index for the degree of relation between each sentence in the topic boundary candidate section and the next topic passage. A backward relation degree is an index for the degree of relation between each sentence in the topic boundary candidate section and the previous topic passage.

Here, the relation degree $r_{s,b}$ between a sentence S and a topic passage b can be defined based on the repetition state of specific vocabulary. For example, the relation degree $r_{s,b}$ is calculated according to the following equation.

$$r_{s,b} = \frac{1}{|S|} \sum_{w \in S} \frac{tf_{w,b}}{|b|} \times \log\left(\frac{|D|}{df_w}\right) \quad (3)$$

In equation (3), $|S|$ represents the total number of words contained in the sentence S, and $|b|$ represents the total number of words contained in the topic passage b. $tf_{w,b}$ represents the appearance frequency of a word w in the topic passage b, and $|D|$ represents the number of blocks obtained by splitting the entire document at intervals of a fixed width (80 words). $df_w$ represents the number of blocks in which word w appears.

The equation (3) is a variant of the measure that a piece of literrature by the inventor of the present invention (Yoshio Nakao, "Automatic Keyword Extraction on the Topic Structure of a Text", SIG Notes FI-50-1, Information Processing Society of Japan, July 1998) proposed as an effective and simple measure for term importance estimation. This piece of literature reports important words, the words that appear in headings in this case, could be effectively extracted by evaluating a word with the mahtmatical formula following Σ in the equation (3) and extracting words in the descending order of the evaluation score.

Tha calculation method of the relation degree $r_{s,b}$ between the sentence S and topic passage b is not limited to equation (3), and a variety of mwthods are available. However, since the relation degree based on equation (3) has the following advantages, this preferred embodiment adopts this calculation method.

The calculation method of the relation degree $r_{s,b}$ between the sentence S and topic passage b is not limited to equation (3), and a variety of methods are available. However, since the relation degree based on equation (3) has the following advantages, this preferred embodiment adopts this calculation method.

(1) High importance is attached to words with a high-appearance frequency in a topic passage.

If a word in the sentence S appears in a topic passage to be calculated in a high appearance frequency, the value of $tf_{w,b}$ increases and the relation degree increases.

(2) High importance is attached to a word with a significantly high appearance density in a topic passage.

The lower the appearance density of a word in an entire document, the larger the value of the log part. Therefore, if a word with a low appearance density in the entire document appears in both the sentence S and the topic passage b, the relation degree increases.

(3) High importance is attached to a word which are locally annotated repeatedly.

The part in log is the inverse number of a modified appearance density calculated by reducing the appearance frequency of a word that locally appears in a concentrated manner such as a word which indicates an important topic and is annotated repeatedly. Therefore, if a word in the sentence S appears concentrated in one place of the topic passage, the relation degree increases.

Since the final boundary position of each topic passage is the start position of a boundary sentence, some of those positions are not determined in the process of a leading sentence detection process. Therefore, in the leading sentence detection process, if the boundary position is not determined, the relation degree is calculated using the position of a cohesion force equilibrium point detected by the topic structure detector 25 as the temporary position of a topic boundary.

Figure 23:
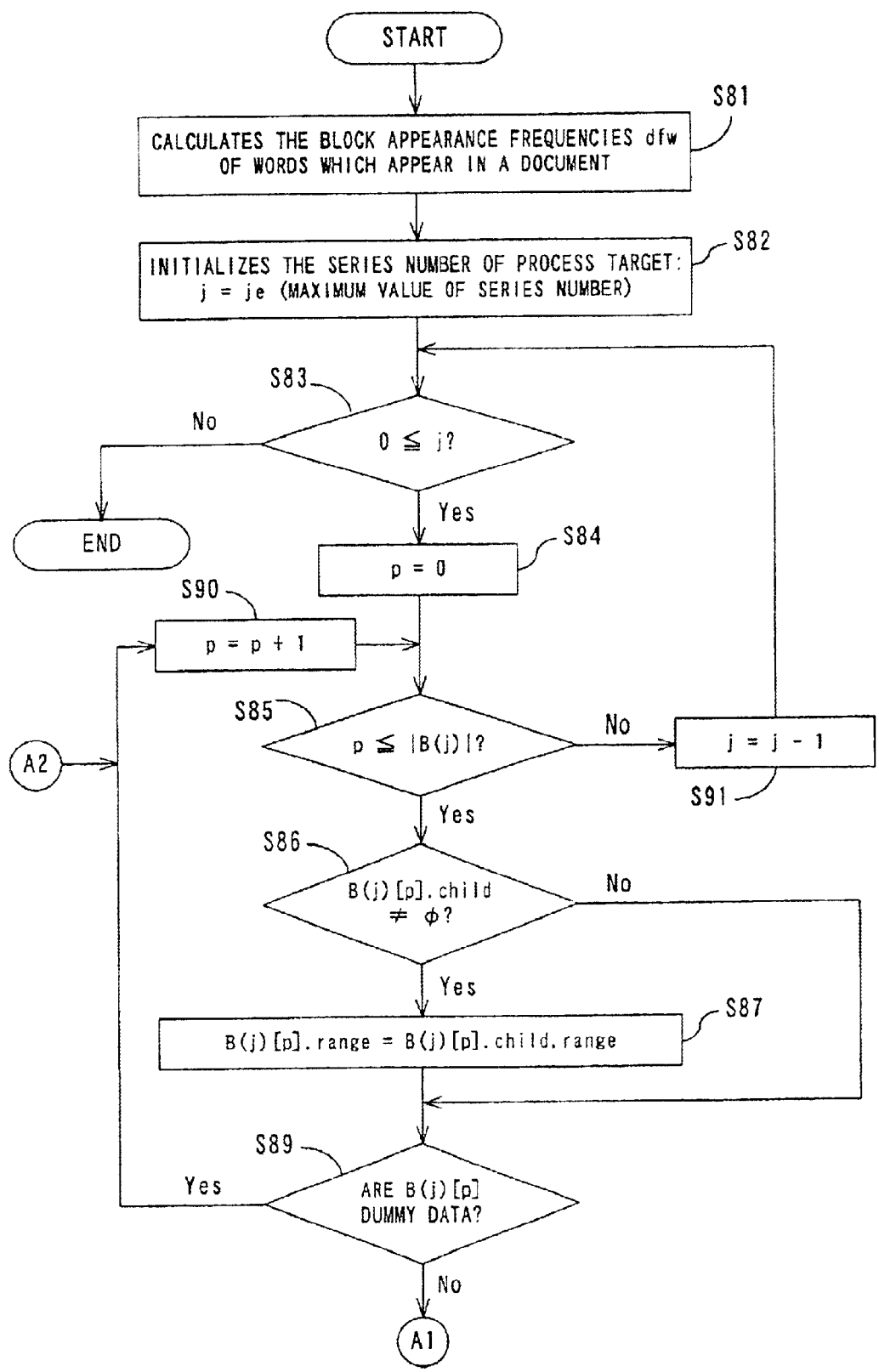
FIG. 23 is a flowchart showing a leading sentence detection process (No. 1).
Figure 24:
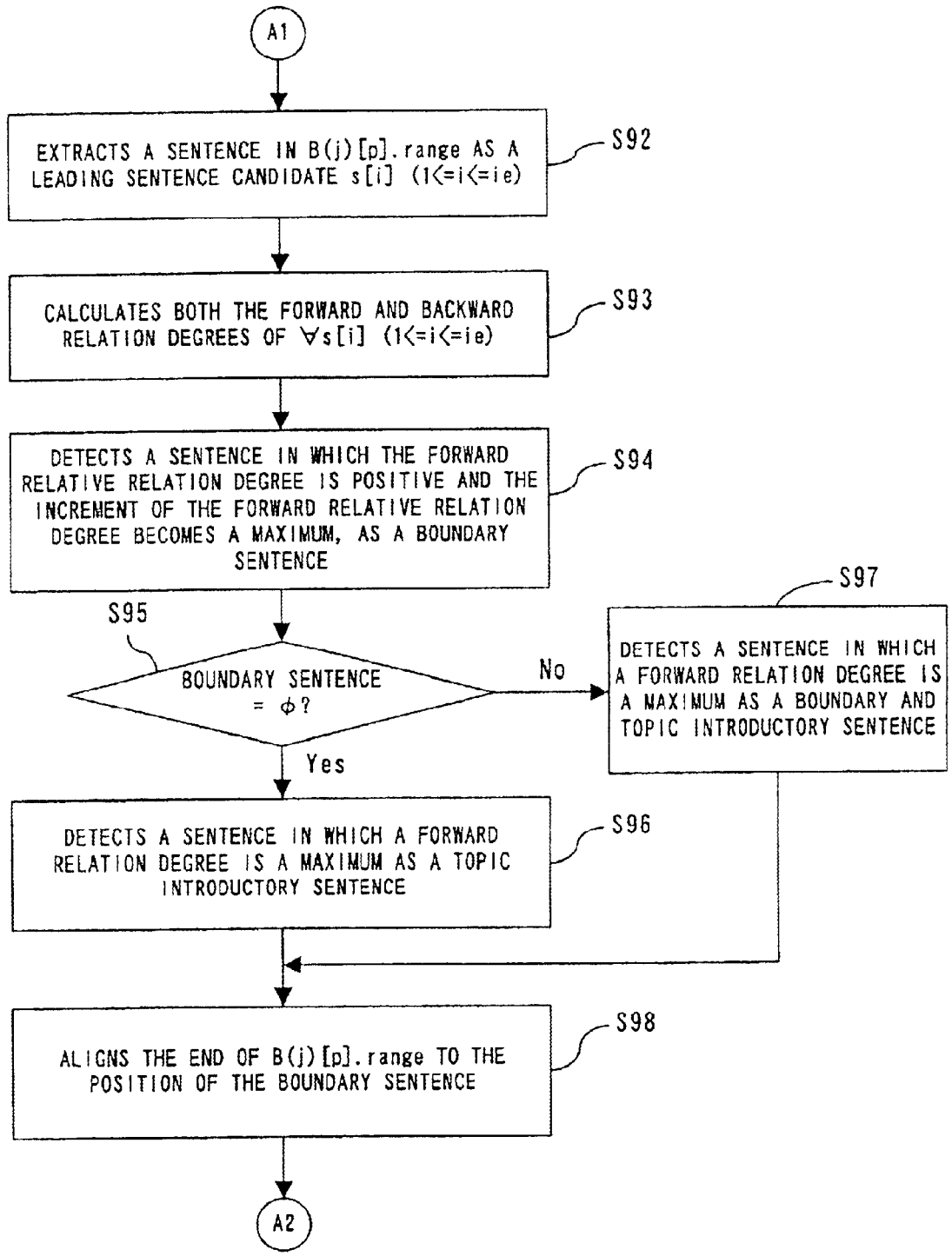
FIG. 24 is a flowchart showing a leading sentence detection process (No. 2).

FIGS. 23 and 24 are flowcharts showing the leading sentence detection process by the leading sentence extractor 27. The leading sentence extractor 27 first divides an entire document into blocks of a fixed width, sums the number of blocks in which each word w in the document appears and records the number as a block appearance frequency $df_w$ (step S81 shown in FIG. 23). Then, the maximum value of a series number je is assigned as the initial value of the control variable j for indicating the series number of a process target (step S82). Thus, topic boundary candidate section data corresponding to the minimum topics are assigned to the process target.

Then, leading sentence detection for a series B(j) is performed as long as j≧0. First, it is judged whether j is 0 or more (step S83), and if j is less than 0, the process is terminated. Then, 0 is assigned to p (step S84) and p and |B(j)| are compared (step S85). If p≦|B(j)|, processes in steps S86 and after are performed. If p exceeds |B(j)|, j=j−1 is assigned (step S91), and the processes in steps S83 and after are repeated.

In step S86, it is judged whether there are topic boundary candidate section data (child candidate section data) about a smaller topic related to B(j)[p]. If there are child candidate section data, B(j)[p].range is replaced with the topic boundary candidate section B(j)[p].child.range (step S87). If there are no child candidate section data, the process in step S87 is skipped.

Then, it is judged whether B(j)[p] are dummy data (step S89). If the data are dummy data, the process shown in FIG. 24 is skipped, p=p+1 is assigned (step S90) and the next data are processed.

If B(j)[p] are not dummy data, the leading sentence extractor 27 extracts a sentence at least a part of which is included in B(j)[p].range, as a candidate for a leading sentence s[i] (1≦i≦ie) (step S92 shown in FIG. 24) and performs the detection process of two kinds of leading sentences (a boundary sentence and a topic introductory sentence). Here, ie represents the number of candidates for extracted leading sentences.

First, the leading sentence extractor 27 calculates both forward and backward relation degrees of all extracted candidates s[i] according to equation (3) (step S93). Then, the leading sentence extractor 27 checks a forward relative relation degree, that is, the difference between the forward relation degree and backward relation degree from the top sentence to the end sentence among the candidates (step S94). Then, the leading sentence extractor 27 detects a sentence at which the forward relative relation degree is positive and the increment of the forward relative relation degree over that of the previous sentence is maximum, as a boundary sentence and recognizes candidates after the boundary sentence as the introductory part.

Generally speaking, both the forward and backward relation degrees often rapidly change on the boundary between topics. Therefore, the detection accuracy of a boundary sentence is expected to be improved by using the increment in the difference between the forward and backward relation degrees as described above.

Then, it is judged whether a boundary sentence can be detected (step S95). If the boundary sentence can be detected, a sentence having the maximum forward relation degree is selected as a topic introductory sentence from candidates located after (or identical to) the boundary sentence (step S96). If the boundary sentence can not be detected, a sentence having the maximum forward relation degree of all candidates is selected as both a boundary sentence and a topic introductory sentence (step S97).

Then, the end of B(j)[p].range is aligned to the position of the detected boundary sentence (step S98), p=p+1 is assigned (step S90 shown in FIG. 23) and the processes in steps S85 and after are repeated. Then, the leading sentence detection process of the next topic boundary candidate section data is performed.

In step S98, the end position of a topic boundary candidate section is modified in order to detect a boundary sentence of a larger topic in the range before the boundary sentence of the topic to be currently processed in a later process. Thus, for example, if a section heading is located immediately after a chapter heading, the possibility of detecting the section and chapter headings as boundary sentences of small and large topics, respectively, can be increased.

FIG. 25 shows a detection example of a leading sentence in the vicinity of the start position of section 4.4 (somewhere short of the 12,000th word on the horizontal axis shown in FIG. 22) of an input document. In FIG. 25, sentences after a sentence marked with <OUTSIDE> (located at the 12,002nd word) and up to the last sentence (located at the 12,055th word) are candidates for a leading sentence, and at least a part of the sentences overlaps a topic boundary candidate section (in this example, a section of 35-word width [12,026, 12,059]). In this example, a topic introductory sentence is selected from the candidates located after a boundary sentence.

In a sentence marked with <BOUNDARY> (located at the 12,031st word), the difference between a forward relation degree (the value of the column "Immediately after") and a backward relation degree (the value of the column "Immediately before"), that is, a forward relative relation degree (the value of a column "After minus before"), is positive (0.016) and an increment from that of the previous sentence (−0.008) is the maximum (0.024). Therefore, this sentence is recognized as a boundary sentence.

The forward relation degree of a sentence marked with <INTRODUCTORY> (located at the 12,033rd word), is the maximum (0.023) in sentences located after the boundary sentence (in this example, two sentences). Therefore, this sentence is detected as a topic introductory sentence.

In a subsequent summary composition process, it is preferable that a boundary sentence is a heading and that a topic introductory sentence is a sentence for introducing a subsequent topic. In the process shown in FIG. 24, it is possible to increase the number of both boundary and topic introductory sentences which meet these requirements by using some additional features of candidates sentence, such as a sentence end expression, a sentence type, etc.

For example, a heading sentence often terminates without a period in English or a "kuten" (fullstop) in Japanese. Under these circumstances, if in step S94, the detection of a boundary sentence is attempted only for sentences which terminate without a period or a "kuten" out of leading sentence candidates, and the detection process for the other sentences only when a boundary sentence could not be detected in those sentences, the possibility that a detected boundary sentence may match the heading of a document can be increased.

A Japanese sentence for introducing a subsequent topic often terminates with the predicative form of a verb, such as "〜する", and an English sentence for introducing a subsequent topic is often a sentence of a present/future tense beginning with a pronoun of the first person, such as "I" or "we", or a noun phrase indicating a document component, such as "This chapter". In this case, if in step S96, the detection of a topic introductory sentence is attempted only for sentences which meet these requirements and the detection process for the other sentences is performed only when a topic introductory sentence can not be detected in those sentences, the possibility that a detected topic introductory sentence may match a sentence for introducing a subsequent topic can be increased.

Figure 26:
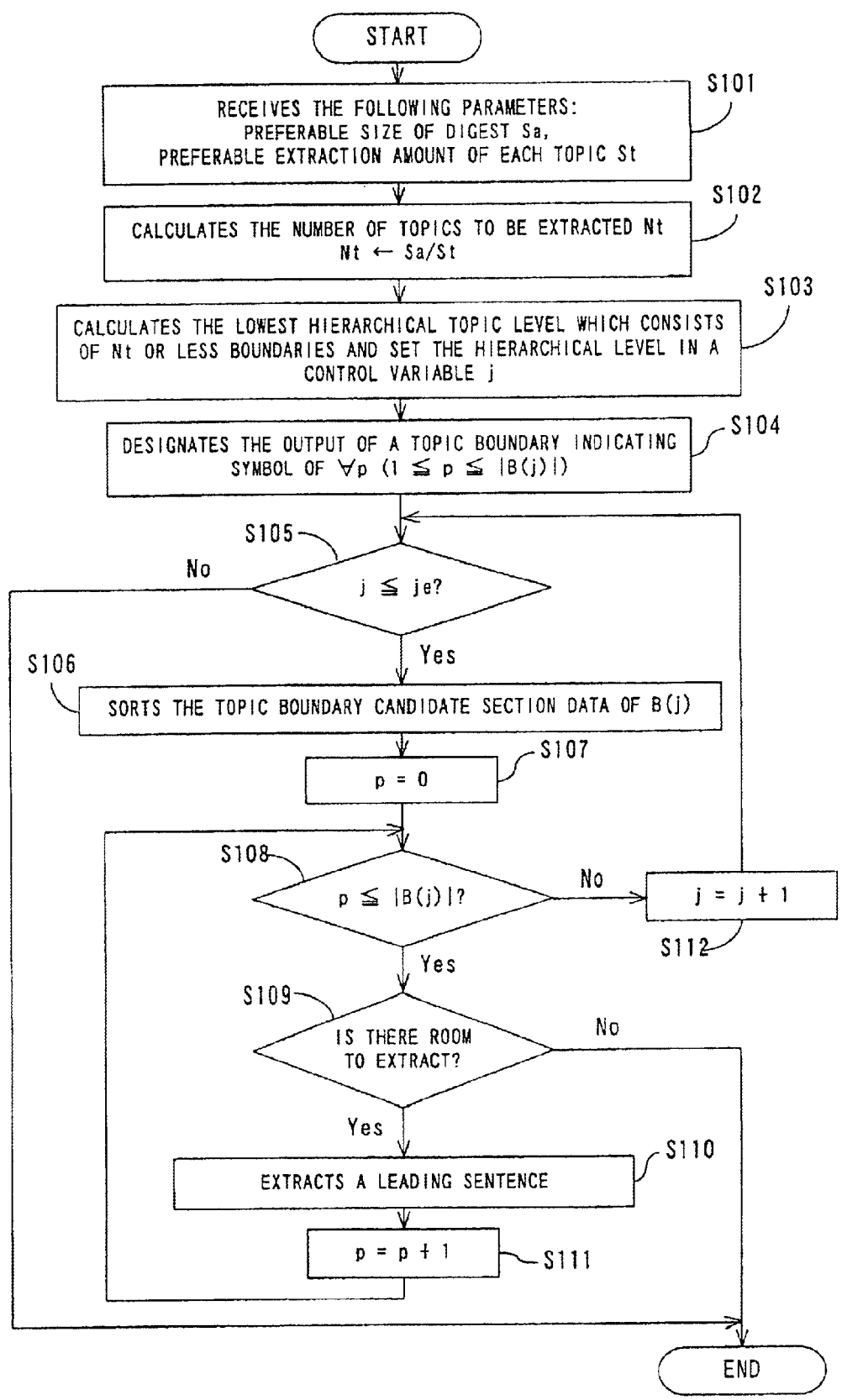
FIG. 26 is a flowchart showing a leading sentence extraction process.

FIG. 26 is a flowchart showing the leading sentence extraction process by the leading sentence extractor 27. The leading sentence extractor 27 first receives from a user two parameters: a preferable size of a summary Sa and a preferable extraction amount of each topic St (step S101).

Then, the leading sentence extractor 27 calculates the appropriate number of topics to be extracted Nt by dividing Sa by St (step S102), selects the topic boundary candidate section data series in the lowest level consisting of Nt or less boundaries, and sets the series number in the control variable j (step S103). Thus, B(j) can be assigned to the basic target of a leading sentence extraction process, and the grading of a topic is determined.

In the example, since Sa and St are assumed to be approximately 1,500 characters and approximately 150 characters, respectively, Nt=10 is obtained. In this case, according to the detection result of a topic structure shown in FIG. 22, topic boundary candidate section data based on a window width of 1,280 words (series number 3) is the basic target of the leading sentence extraction process.

Then, for all topic boundary candidate section data B(j)[p] of a series number j, the leading sentence extractor 27 sets the output position of a topic boundary indicating symbol at the start position of a boundary sentence located at the front in each topic boundary candidate section, that is, the boundary sentence of the largest topic passage (step S104). Based on this information, leading sentences will be separated and outputted for each topic passage when the output unit 28 generates a summary.

The leading sentence extractor 27 continues to perform the process of extracting a leading sentence from B(j) series, as long as j≦je.

First, the leading sentence extractor 27 judges whether j is je or less (step S105), and if j is more than je, the leading sentence extraction process is terminated.

If j is je or less, the leading sentence extractor 27 designates B(j) as a leading sentence extraction series and calculates a series number corresponding to the largest topics passage whose topic boundary candidate section datum is related to each topic boundary candidate section datum B(j)[p]. Then, the leading sentence extractor 27 sorts this B(j)[p] data in ascending order of the obtained series number (step S106). Thus, the data number p of B(j)[p] are rearranged in the sorting order.

Such an operation is not essential, but is performed in order to extract a leading sentence from larger topics with higher priority. Thus, if a leading sentence extraction process is stopped due to the restriction on the output amount of a summary in step S109, a leading sentence for a larger topic can be used by the summary.

Then, the leading sentence extractor 27 assigns 0 to p (step S107) and compares p with |B(j)| (step S108). If p<|B(j)|, the leading sentence extractor 27 performs the processes in steps S109 and after. If p exceeds |B(j)|, the leading sentence extractor 27 assigns j=j+1 (step S112) and repeats the processes in steps S105 and after.

Then, the leading sentence extractor 27 checks whether there is room to extract a sentence under the restriction of Sa and St (step S109). If there is no room to extract, the leading sentence extraction process is terminated. If there is room to extract, the leading sentence extractor 27 extracts a boundary sentence, a topic introductory sentence and the foremost boundary sentence of the boundary sentences contained in the topic boundary candidate section of B(j)[p] to be processed as sentences to be extracted (step S110).

Then, the leading sentence extractor 27 assignes the next piece of data to a process target by assigning p=p+1 (step S111), and repeats the processes in steps S108 and after.

Since a topic passage of a small cohesion degree often has no detailed information as in a part where only supplementary items are listed, there is a case that skipping sentence extraction from those parts causes a preferable effect to make the resultiny summary more concise. The following reformation of the leading sentence extraction procedure is an example of appropriate ways for such purpose. First, prior to the step S110, the leading sentence excctractor 27 calculates the cohesion degree of the topic passage that follows the surrent target datum B(j)[p], then skips step S110 if obtained cohesion degree is smaller than a specific reference value.

Figure 27:
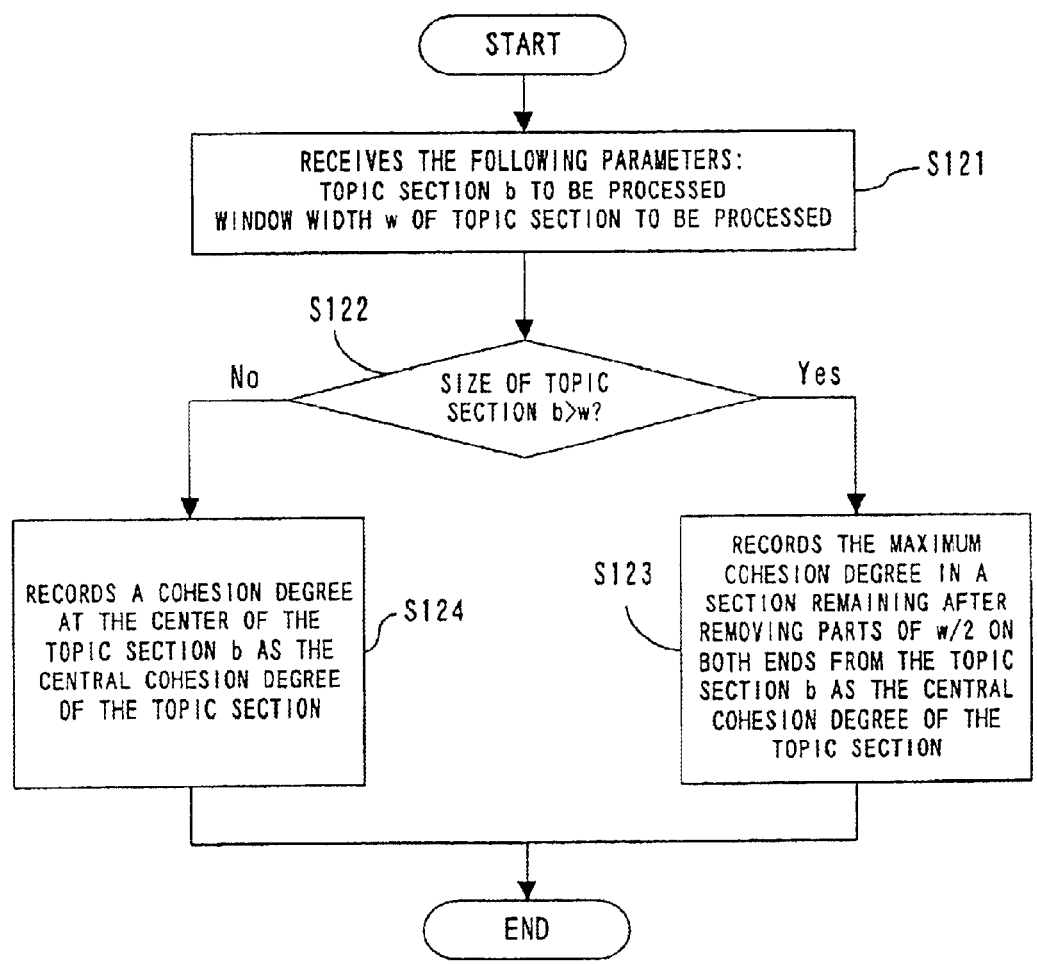
FIG. 27 is a flowchart showing a central cohesion calculation process.

FIG. 27 is a flowchart showing the cohesion degree calculation process performed in such a case. The leading sentence extractor 27 first receives a topic section to be processed b and the window width of the topic section w (step S121) and compares the size of the topic section b with w (step S122).

If the size of the topic section b is larger than w, the leading sentence extractor 27 calculates the maximum cohesion degree in a section remaining after removing parts of w/2 on both ends from the topic section b, records the value as a central cohesion degree (step S123) and terminates the process. If the size of the topic section b is w or less than w, the leading sentence extractor 27 stores the cohesion degree in the center position of the topic section b as a central cohesion degree (step S124) and the process is terminated. The central cohesion degree obtained in this way is compared with the reference value and it is judged whether the extraction of a leading sentence is skipped.

Figure 28:
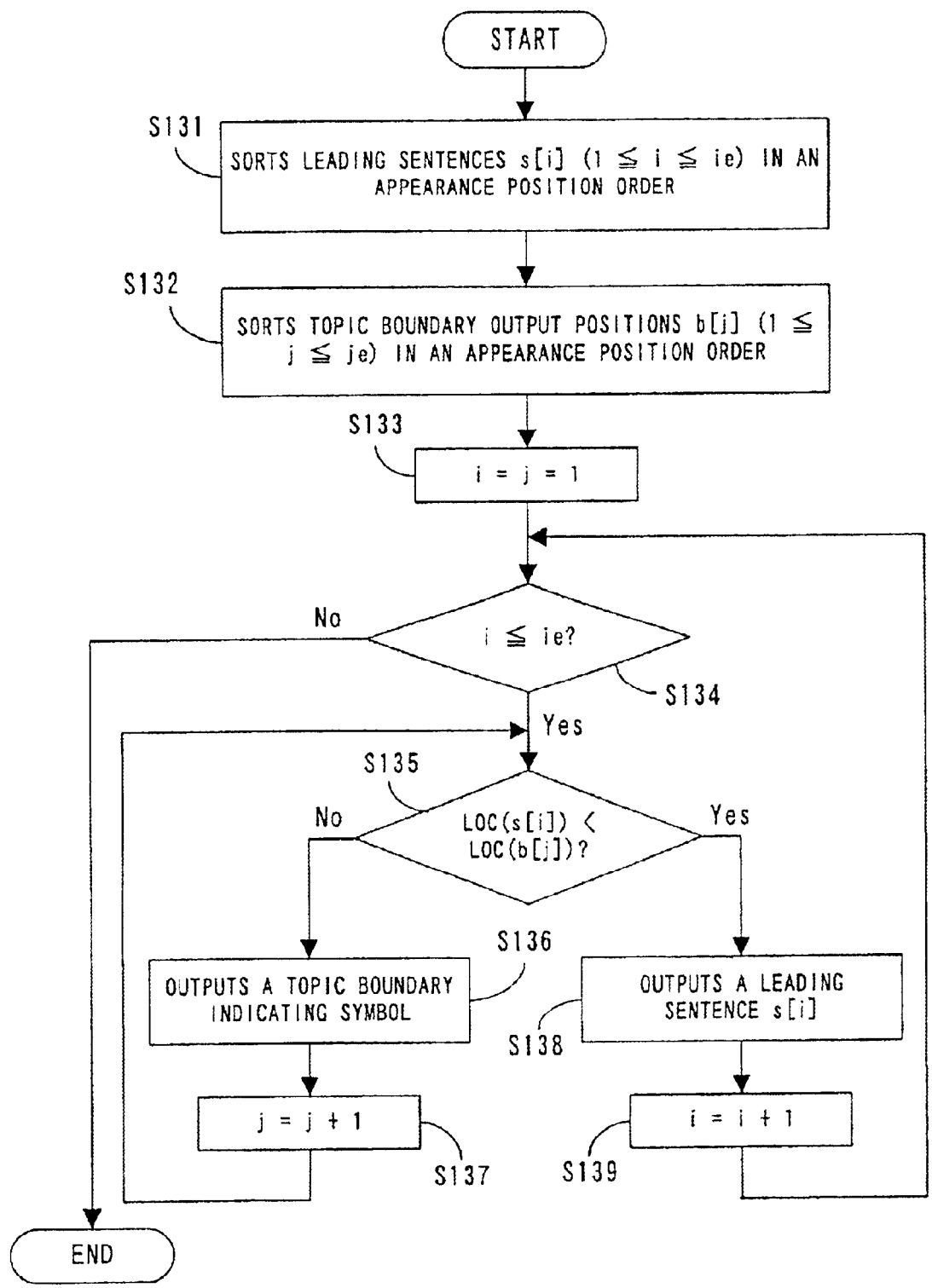
FIG. 28 is a flowchart showing a summary composition process.

FIG. 28 is a flowchart showing a summary generation process by the output unit 28. The output unit 28 first designates the leading sentences extracted by the leading sentence extractor 27 as s[i] (1≦i≦ie) and sorts the leading sentences in the appearance position order in an input document 11 (step S131). Then, the output unit 28 designates the output positions of topic boundary indicating symbols set by the leading sentence extractor 27 as b[j] (1≦j≦je) and sorts the output positions in the same way (step S132).

Then, the output unit 28 assigns 1 to both the control variables i and j to assign the first items of both the leading sentences and topic boundary output positions to a process target (step S133). Then, the output unit 28 continues to perform the output process of leading sentences as long as i≦ie.

In this process, the output unit 28 first compares i with ie (step S134) and if i>ie, the process is terminated. If i≦ie, the output unit 28 compares the location data LOC of (b[j]) of the topic boundary output position b[j] with the location data LOC(s[i]) of the leading sentence s[i] to be outputted (step S135).

If the leading sentence s[i] is located after the topic boundary output position b[j], the output unit 28 outputs a topic boundary indicating symbol (step S136), assigns j=j+1 (step S137) and repeats the processes in steps S135 and after. A topic boundary indicating symbol is a symbol used to separate a topic of an approariate grading, which is determined to be extracted by the leading sentence extractor 27, and, for example, is a blank line, etc.

If the leading sentence s[i] is located before the topic boundary output position b[j], the output unit 28 outputs the leading sentence s[i] (step S138), assigns the next leading sentence to an output target by assigning i=i+1 (step S139), and repeats the processes in steps S134 and after.

FIGS. 29, 30 and 31 show a summary generated by such a process. This summary has a length of 1,449 characters (the ratio of the number of characters to those in the input document is 1.5%), is divided into eleven parts by ten blank lines (topic boundary indicating symbols) and is outputted. This summary result shows that an appropriate amount of topics of an appropriate grading is taken into a summary according to parameters with which the leading sentence extractor 27 is provided.

In the parts separated by a blank line in this summary generation, most of the relations between sentences are clear. In addition, the content of a sentence often relates to the introduction of a research content, etc., and is easy to understand. However, there is a part with an in appropriate mixture of topics, such as "4.3.3 電子出版及び電子図書館" contained in a part beginning with "(4) 分散検索", shown in FIG. 30, although the number of such parts is smaller.

However, on the whole, the summary generation result shown in FIGS. 29, 30 and 31 indicates that according to the present invention, even a long document can be summarized as intended. The fact that an appropriate heading is often extracted at the beginning of each part separated by a blank line indicates that according to the present invention, appropriate topic boundaries can be detected even without referring to a logical structure of a document.

By utilizing the fact that an appropriate heading is often extracted at the beginning of each part separated by a blank line, the topic structure in a summary can be more heavily emphasized and more clearly presented. For example, the break of a topic can be more heavily emphasized and more clearly presented by handling a sentence immediately after a blank line as a heading, outputting the sentence as an independent line and indenting subsequent sentences.

FIG. 32 shows an example of emphasizing a topic passage in a summary by such a method. This summary generation result is obtained by emphasizing and outputting a heading located immediately after a topic boundary indicating symbol (blank line) after modifying the length parameter of an entire summary (preferable size of a summary Sa) to 500 characters and extracting leading sentences.

The summary shown in FIG. 32 includes the headings of sections 4.1, 4.3 and 4.4, but does not include the heading of section 4.2. In such a case, the reader of the summary may bother about what is written in section 4.2. Such a mental load of the reader can be reduced by removing or reforming an order specifying label of a heading as shown in FIG. 35.

For example, if the order label is removed from the heading, first the heading is outputted, the order label is processed into a form like "(4.参照)", meaning "see section 4", and attached to the heading as supplementary information (corresponding point indicating expression) for indicating a correspondence with an original document, a summary as shown in FIG. 33 can be generated. In FIG. 33, "(4.参照)", "(4.3参照)" and "(4.4参照)" are attached to the respective headings as corresponding point indicating symbols.

Figure 34:
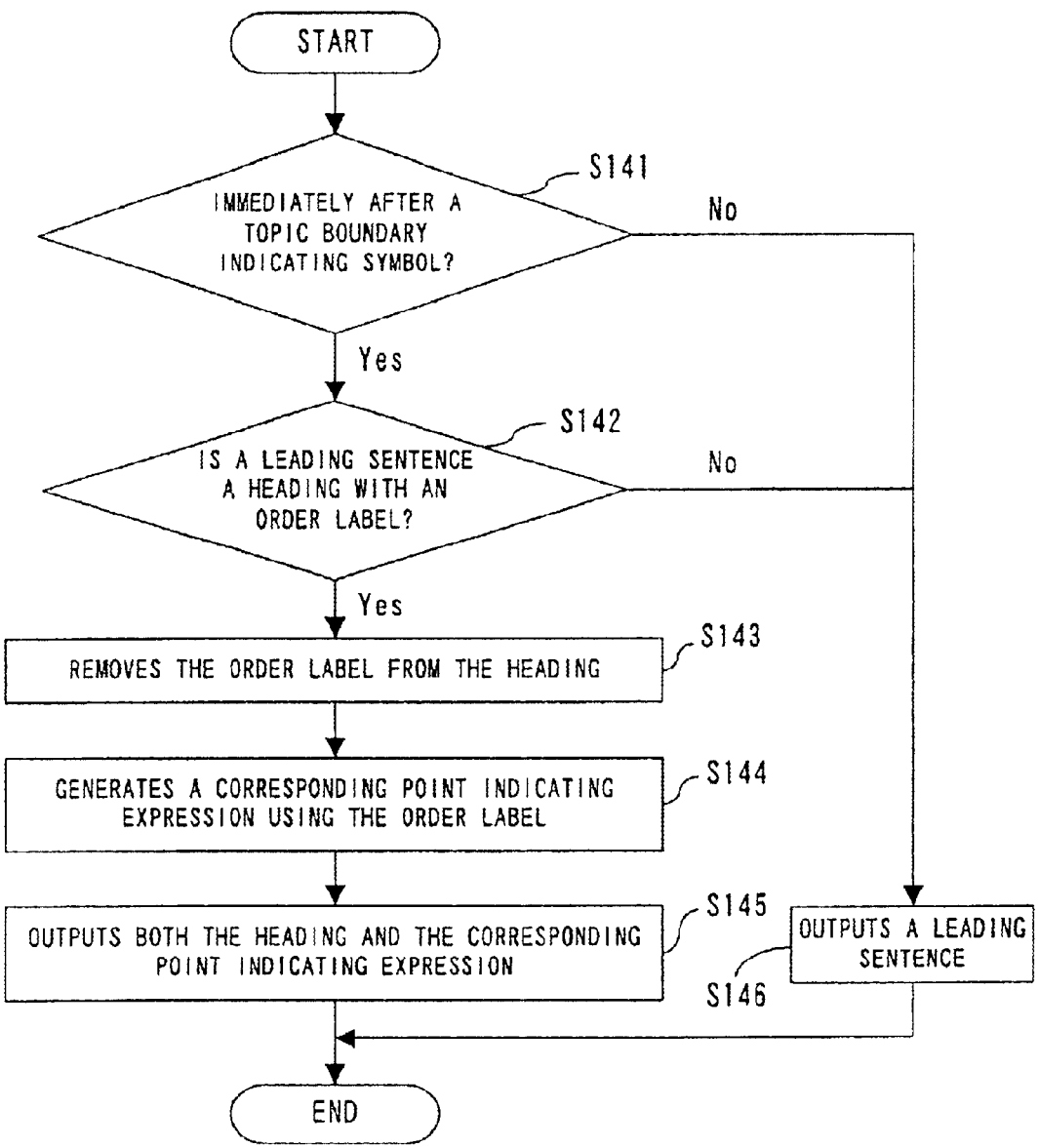
FIG. 34 is a flowchart showing a leading sentence output process.

FIG. 34 is a flowchart showing such a leading sentence output process. This process is performed in step S138 shown in FIG. 28 instead of an ordinary output process. The output unit 28 first judges whether the position of a leading sentence to be outputted s[i] is immediately after a topic boundary indicating symbol (step S141). If the position is immediately after the topic boundary indicating symbol, the output unit 28 judges whether s[i] is a heading with an order label (step S142).

If s[i] is a heading with an order label, the output unit 28 removes the order label from the heading (step S143) and generates a corresponding point indicating expression using the order label (step S144). Then, the output unit 28 outputs both the heading and corresponding point indicating expression (step S145) and the process is terminated.

If in step S141 the position of s[i] is not immediately after the topic boundary indicating symbol and if in step S142 s[i] is not a heading with an order label, the output unit 28 outputs s[i] as usual (step S146) and the process is terminated.

In the summary generation process described above, in addition to a blank line, arbitrary indication information, such as a ruled line, etc., can be used as a topic boundary indicating symbol, and an order label can include arbitrary order information, such as a chapter number, alphabet, etc., in addition to a section number. For the corresponding point indicating expression, an arbitrary expression can be used in addition to "(4.参照)".

In the summary generation process described above, a topic in a resulting summary is divided and outputted using only one hierachical level of topic boundaries (boundary data of B(1) series in FIG. 33). However, if a plurality of hierarchical levels of topic boundaries are used together, both major and minor topics can be separated and outputted in a resulting summary.

For example, a part beginning with "ネットワーク上(4.3 の検索サービス(4.3参照))" includes the respective boundary sentences "(1)キーワード抽出" and "(4)分散検索" of the boundary data B(2)[2] and B(2)[3] of B(2) series. If the boundary sentences are handled as headings and outputted in the same procedure, a summarization result as shown in FIG. 35 is obtained.

A case where a draft specification for a U.S. patent application (23,000 words) is used for an English input document is described next. In this example, the following process and parameters are adopted.

(1) Word detection method: a method of using a stop word list
(2) Window widths for cohesion degree calculation:
Maximum window width $w_1$=6,556 (words)
Minimum window width $w_{min}$=104 (words)
Interval width tic=13 (words)(average number of words per sentence in the input document)
(3) Extraction amount in leading sentence extraction:
Preferable size of summary Sa: Approximately 1,000 characters
Preferable extraction amount of each topic St: Approximately 300 characters Since it is not appropriate to attach the entire document for reference, a list of headings in the input document is shown in FIG. 36. In FIG. 36, expressions inside ( ) are the abbreviations of headings attached for clarification, and they are not contained in the input document.

FIG. 37 shows the beginning part of the input document, and FIG. 38 shows the result of the tokenization process of the part. In FIG. 38, parts bracketed by [ ]correspond to detected words. A word with a capital letter for only the first character of the word is replaced with a word with all small letters inside [ ].

In this example, words are extracted using a space and a piece of punctuation, such as ",", ".", ":", ";", etc., as a clue, and out of those, words included in a stop word list shown in FIG. 39 are removed. A stop word list is a list in which words that are not desired to be extracted as keywords, such as articles, prepositions, etc., are defined in advance.

Figure 40:
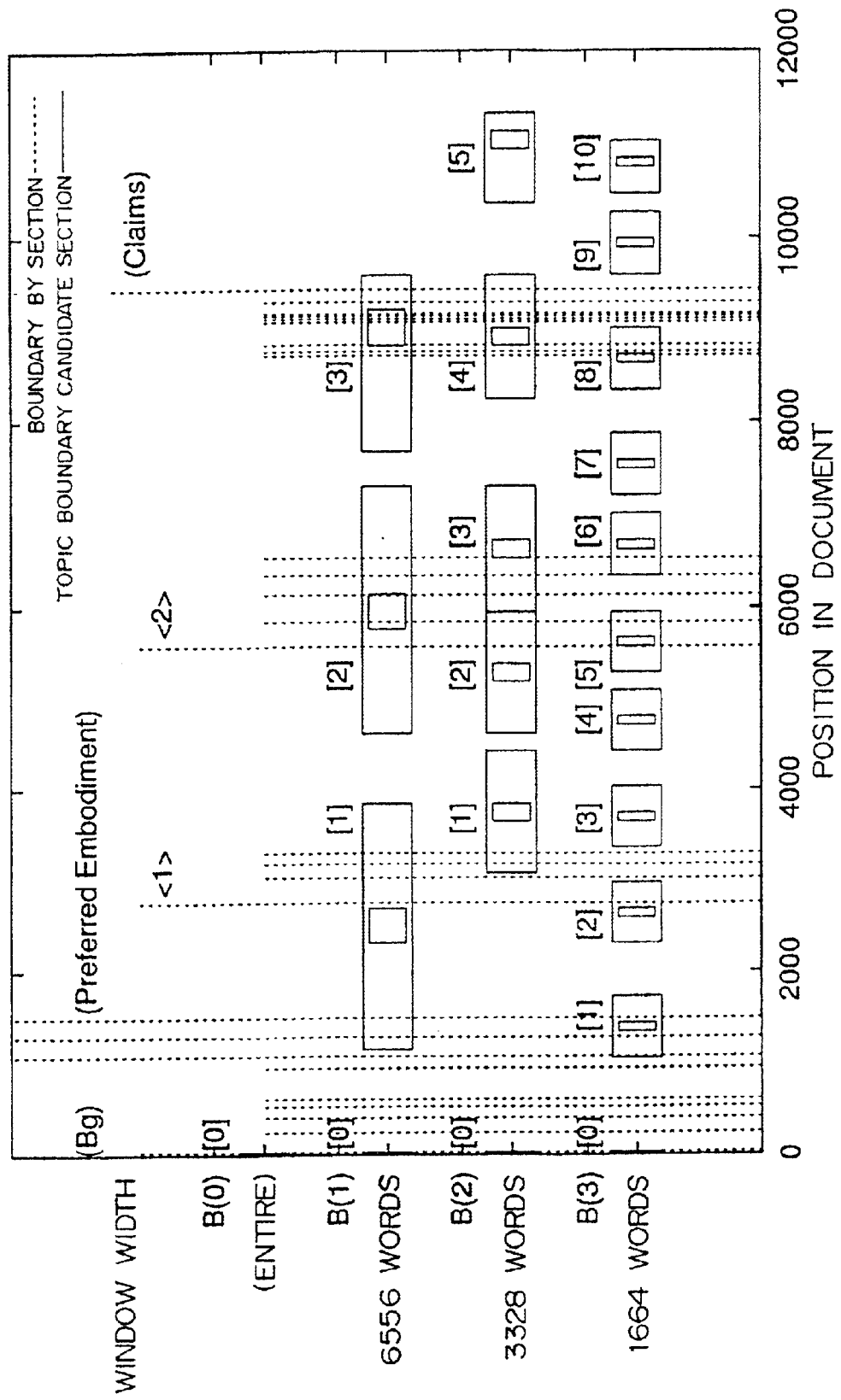
FIG. 40 shows the second detection result of a topic structure.

FIG. 40 shows the topic structure detection result by the topic structure detector 25. In FIG. 40, (Bg), <1>, etc., which are described near a section boundary, represent the abbreviations of the headings shown in FIG. 36.

FIG. 41 shows the detection example of a leading sentence in the vicinity of the start position of the heading of <2>in the input document (somewhere short of the 6,000th word on the horizontal axis shown in FIG. 40). In FIG. 41, a sentence between the first sentence (located at the 5,522nd word) and the last sentence (located at the 5,571st word) is a candidate for a leading sentence, and at least a part of these sentences overlaps a topic boundary candidate section (in this example, the 41-word width section of [5,545, 5,585]).

In a sentence marked with <BOUNDARY> (located at the 5,564th word), the difference between a forward relation degree (the value of a column "immediately after") and a backward relation degree (the value of a column "immediately before"), that is, a forward relative relation degree (the value of a column "immediately after" minus "immediately before") is positive (0.089) and the increment after a forward relative relation degree immediately before the present one (−0.026) is the maximum (0.115). Therefore, this sentence is detected as a boundary sentence.

In a sentence marked with <INTRODUCTORY> (located at the 5,567th word), the forward relation degree is the maximum (0.051) among sentences after the boundary sentence (in this example, two sentences). Therefore, this sentence is detected as a topic introductory sentence.

FIG. 42 shows a summary generated by grouping the extracted leading sentences by four major topics corresponding to B(1) shown in FIG. 40. This summary has a length of 914 characters (the ratio of the number of characters to those in the input document is 0.7%), and is divided into four parts. In this example, the leading sentence of each topic is outputted as a heading. If sentences which terminate without a period continue in the beginning of each topic, all such sentences are handled as headings and are outputted.

In the preferred embodiments described above, a summarization processes is described using both Japanese and English documents as examples. However, in addition to these documents, the present invention can apply to a document of an arbitrary language and an arbitrary form, and a similar result can be obtained.

An input document is not necessarily limited to a digitized electronic document, and, for example, a document printed on a medium of paper, etc., can also be used. In this case, by reading document images using an opto-electronic converter, such as an image scanner, etc., and recognizing the characters, document data in which a tokenization is available can be generated.

According to the present invention, for a long document of several tens of pages, the hierarchical structure of topics including topic passages ranging from approximately ½ to ¼ of the entire document size to an approximate size of a paragraph (several tens of words to 100 words) can be detected. By utilizing this hierarchical structure, a summary with a concise summary, containing sentences which directly indicate the topic, can be generated. By utilizing the hierarchical structure of topics, a summary can be divided into several topics of an appropriate grading and be outputted.

Accordingly, even a long document, a summary the content of which is easy to understand can be generated, and even a long summary can be presented in a form that is easy to read.

What is claimed is:

1. A text summarization apparatus, comprising:
    a structure detection device setting up window widths of several sizes, measuring a cohesion degree indicating the strength of lexical cohesion in each window width, obtaining both global cohesion due to words repeated at long intervals and local cohesion due to words repeated at short intervals based on the cohesion degree, and detecting a hierarchical structure of topics of a given document based on the global cohesion and local cohesion;
    a leading sentence extraction device detecting an introductory part of each topic and extracting one or more sentences which directly indicate topic content from the introductory part as leading sentences in a concentrated manner based. on the hierarchical structure of topics detected by said structure detection device; and
    a summary composition device grouping the leading sentences for each topic extracted by said leading sentence extraction device, and generating a summary.

2. The text summarization apparatus according to claim 1, wherein said leading sentence extraction device extracts a boundary sentence corresponding to a turning point of a topic as a leading sentence from sentences located in a vicinity of a topic boundary detected by said structure detection device, based on a difference between a forward relation degree indicating a relation degree between a sentence and a topic passage immediately after the topic boundary, and a backward relation degree indicating a relation degree between the sentence and a topic passage immediately before the topic boundary.

3. The text summarization apparatus according to claim 2, wherein said leading sentence extraction device further extracts a topic introductory sentence serving a purpose of introducing a topic from sentences of the introductory part beginning with the boundary sentence as a leading sentence based on the forward relation degree.

4. The text summarization apparatus according to claim 1, wherein said summary composition device groups the leading sentences for each topic of an appropriate size and outputs the grouped sentences.

5. The text summarization apparatus according to claim 4, wherein said leading sentence extraction device determines a size of a topic to be used by the summary according to an output amount of the summary.

6. The text summarization apparatus according to claim 1, wherein said summary composition device removes order label information of a heading included by the leading sentence from the leading sentence and outputs a leading sentence without the order label information.

7. The text summarization apparatus according to claim 6, wherein said summary composition device processes the order label information and outputs the order label information as supplementary information for the leading sentence without the order label information.

8. A text summarization apparatus, comprising:
    a leading sentence extraction device detecting an introductory part of a topic for each given topic boundary and extracting one or more sentences which directly indicate topic content, from the introductory part by identifying and extracting a boundary sentence corresponding to a turning point of a topic, from sentences located in a vicinity of a topic boundary, based on a difference between a forward relation degree indicating a relation degree between the boundary sentence and a following topic passage immediately after the topic boundary, and a backward relation degree indicating a relation degree between the boundary sentence and a preceding topic passage immediately before the topic boundary; and
    a summary composition device generating a summary using the extracted sentences.

9. A computer-readable storage medium on which is recorded a program enabling a computer to execute a process, said process comprising:
    setting up window widths of several sizes;
    measuring a cohesion degree indicating a strength of lexical cohesion in each window width;
    obtaining both global cohesion due to words repeated at long intervals and local cohesion due to words repeated at short intervals based on the cohesion degree;
    detecting a hierarchical structure of topics in a given document based on the global and local cohesion;
    detecting an introductory part of each topic based on the hierarchical structure of topics that was detected;
    extracting one or more sentences directly indicating topic content from the introductory part in a concentrated manner based on the hierarchical structure of topics that was detected; and
    grouping the one or more sentences for each topic to generate a summary.

10. A text summarization method, comprising:
    setting up window widths of several sizes;
    measuring a cohesion degree indicating a strength of lexical cohesion in each window width;
    obtaining both global cohesion due to words repeated at long intervals and local cohesion due to words repeated at short intervals based on the cohesion degree;
    detecting a hierarchical structure of topics in a given document based on the global and local cohesion;
    detecting an introductory part of each topic based on the hierarchical structure of topics that was detected;
    extracting one or more sentences directly indicating a topic content from the introductory part in a concentrated manner based on the hierarchical structure of topics that was detected; and grouping the one or more sentences for each topic to generate a summary.

11. A text summarization apparatus, comprising:

structure detection means for setting up window widths of several sizes;

measuring a cohesion degree indicating a strength of lexical cohesion in each window width;

obtaining both global cohesion mainly due to words repeated at long intervals and local cohesion due to words repeated at short intervals based on the cohesion degree, and detecting a hierarchical structure of topics in a given document based on the global and local cohesion;

leading sentence extraction means for detecting an introductory part of each topic and extracting one or more sentences which directly indicate topic content from the introductory part as leading sentences in a concentrated manner based on the hierarchical structure of topics detected by said structure detection means; and summary composition means for grouping the one or more sentences for each topic and for generating a summary.

12. A text summarization apparatus, comprising:

leading sentence extraction means for detecting an introductory part of a topic for each given topic boundary and extracting one or more sentences which directly indicate topic content, from the introductory part by identifying and extracting a boundary sentence corresponding to a turning point of a topic from sentences located in a vicinity of the topic boundary, based on a difference between a forward relation degree indicating a relation degree between a sentence and a following topic passage immediately after the topic boundary and a backward relation degree indicating a relation degree between the sentence and a preceding topic passage immediately before the topic boundary; and summary composition means for generating a summary using the extracted sentences.

13. A text summarization apparatus, comprising:

a structure detection device to detect a hierarchical structure of topics of a given document;

a leading sentence extraction device to detect an introductory part of each topic and extract at least one leading sentence which directly indicates topic content of the introductory part, by extracting a boundary sentence, corresponding to a turning point of a topic, from sentences located in a vicinity of a topic boundary detected by said structure detection device, based on a difference between a forward relation degree indicating a relation degree between the boundary sentence and a following topic passage immediately after the topic boundary, and a backward relation degree indicating a relation degree between the boundary sentence and a preceding topic passage immediately before the topic boundary; and a summary composition device to group the leading sentences for each topic extracted by said leading sentence extraction device, and to generate a summary.

14. A text summarization apparatus, comprising:

a structure detection device to detect a hierarchical structure of topics of a given document;

a leading sentence extraction device to detect an introductory part of each topic and extract at least one leading sentence which directly indicates topic content of the introductory part, by extracting a boundary sentence, corresponding to a turning point of a topic, from sentences located in a vicinity of a topic boundary detected by said structure detection device, based on a difference between a forward relation degree indicating a relation degree between the boundary sentence and a following topic passage immediately after the topic boundary, and a backward relation degree indicating a relation degree between the boundary sentence and a preceding topic passage immediately before the topic boundary, and by further extracting a topic introductory sentence serving a purpose of introducing a topic from sentences of the introductory part beginning with the boundary sentence as a leading sentence based on the forward relation degree; and a summary composition device to group the leading sentences for each topic extracted by said leading sentence extraction device, and to generate a summary.

15. A text summarization apparatus, comprising:

a structure detection device to detect a hierarchical structure of topics of a given document;

a leading sentence extraction device to detect an introductory part of each topic and extract leading sentences which directly indicate. topic content of the introductory part in a concentrated manner; and a summary composition device to group the leading sentences for each topic extracted by said leading sentence extraction device, to remove from the leading sentences order label information of a heading included by said leading sentence extraction device, and to generate a summary including the leading sentences without the order label information.

16. The text summarization apparatus according to claim 15, wherein said summary composition device processes the order label information and outputs the order label information as supplementary information for the leading sentence without the order label information.

* * * * *

UNITED STATES PATENT AND TRADEMARK OFFICE
CERTIFICATE OF CORRECTION

PATENT NO. : 6,963,830 B1 Page 1 of 1
APPLICATION NO. : 09/593151
DATED : November 8, 2005
INVENTOR(S) : Yoshio Nakao It is certified that error appears in the above-identified patent and that said Letters Patent is hereby corrected as shown below:

Column 27, line 42, after "based" delete ".".
Column 30, line 37, after "indicate" delete ".".

Signed and Sealed this

Nineteenth Day of December, 2006

JON W. DUDAS
*Director of the United States Patent and Trademark Office*